US012744935B2

(12) United States Patent
Thudor et al.

(10) Patent No.: US 12,744,935 B2
(45) Date of Patent: Sep. 22, 2026

(54) PROVIDING SEGMENTATION INFORMATION FOR IMMERSIVE VIDEO

(71) Applicant: InterDigital CE Patent Holdings, SAS, Paris (FR)

(72) Inventors: Franck Thudor, Rennes (FR); Bertrand Chupeau, Rennes (FR); Francois-Louis Tariolle, Liffré (FR); Remy Gendrot, Montgermont (FR)

(73) Assignee: InterDigital CE Patent Holdings, SAS, Paris (FR)

( * ) Notice: Subject to any disclaimer, the term of this patent is extended or adjusted under 35 U.S.C. 154(b) by 30 days.

(21) Appl. No.: 18/855,296

(22) PCT Filed: Apr. 24, 2023

(86) PCT No.: PCT/EP2023/060585

§ 371 (c)(1),
(2) Date: Oct. 8, 2024

(87) PCT Pub. No.: WO2023/208808

PCT Pub. Date: Nov. 2, 2023

(65) Prior Publication Data

US 2025/0337952 A1 Oct. 30, 2025

(30) Foreign Application Priority Data

Apr. 27, 2022 (EP) .................................... 22305627

(51) Int. Cl.
*H04N 19/597* (2014.01)
*H04N 19/70* (2014.01)

(52) U.S. Cl.
CPC .......... *H04N 19/597* (2014.11); *H04N 19/70* (2014.11)

(58) Field of Classification Search
CPC ............................ H04N 19/597; H04N 19/70
See application file for complete search history.

(56) References Cited

U.S. PATENT DOCUMENTS 11,861,788 B1 * 1/2024 Taghavi Nasrabadi ...................... G06T 15/08
2020/0154121 A1 * 5/2020 Boyce ................ H04N 21/2365
(Continued)

FOREIGN PATENT DOCUMENTS

WO WO-2021122881 A1 * 6/2021 ........... H04N 21/816
WO WO-2021191500 A1 * 9/2021 ........... H04N 21/816
WO WO-2023148117 A1 * 8/2023 ............... G06T 7/10

OTHER PUBLICATIONS

MPEG Immersive Video Coding Standard (Year: 2021).*
(Continued)

*Primary Examiner* — Fernando Alcon
(74) *Attorney, Agent, or Firm* — Klintworth & Rozenblat LLP

(57) ABSTRACT

Systems and methods are provided in which a plurality of source views of a scene are encoded as an immersive video comprising a plurality of patches. The patches are segmented based on segmentation information from at least one of the source views. The segmentation information associates each of a plurality of regions of the source view with a respective entity. Information is also encoded that indicates which of the source views are associated with the segmentation information used to segment the patches. This information may be used to provide improved rendering, particularly where rendering is performed of less than all entities in the scene.

20 Claims, 18 Drawing Sheets

(56) References Cited

U.S. PATENT DOCUMENTS

| | | | | |
|---|---|---|---|---|
| 2021/0092444 | A1* | 3/2021 | Ilola | H04N 21/816 |
| 2021/0099701 | A1* | 4/2021 | Tourapis | H04N 19/60 |
| 2021/0258590 | A1* | 8/2021 | Boyce | H04N 19/39 |
| 2021/0295567 | A1* | 9/2021 | Lee | G06T 9/001 |
| 2021/0320962 | A1* | 10/2021 | Oh | G06T 9/001 |
| 2022/0345742 | A1* | 10/2022 | Jeong | H04N 19/105 |
| 2023/0011027 | A1* | 1/2023 | Lee | H04N 13/111 |
| 2023/0042874 | A1* | 2/2023 | Dore | H04N 19/597 |
| 2023/0232031 | A1* | 7/2023 | Lee | H04N 19/136 375/240.08 |
| 2023/0345020 | A1* | 10/2023 | Yu | G06T 7/50 |
| 2024/0040148 | A1* | 2/2024 | Nguyen Canh | H04N 19/103 |
| 2024/0089499 | A1* | 3/2024 | Nguyen Canh | H04N 19/17 |
| 2024/0223767 | A1* | 7/2024 | Yang | H04N 19/186 |
| 2024/0348807 | A1* | 10/2024 | Oh | H04N 19/70 |
| 2024/0388729 | A1* | 11/2024 | Yu | H04N 19/70 |
| 2025/0097460 | A1* | 3/2025 | Oh | H04N 19/597 |

OTHER PUBLICATIONS

White paper on MPEG Immersive Video (Year: 2022).*

International Search Report and Written Opinion for PCT/EP2023/060585 mailed Jun. 26, 2023 (15 pages).

Boyce, J.M., et al., "MPEG immersive video coding standard" Proceedings of the IEEE, 2021 (16 pages).

Salahieh, B. et al., "Test model 11 for MPEG Immersive Video." ISO/IEC JTC 1/SC 29/WG 4, N0142, WG 4 MPEG Video Coding, Jul. 2021 (53 pages).

"Information technology—coded representation of immersive media (MPEG—Immersive video)" Part 12, ISO/IEC/JTC1/SC29-23090-2E, 2022 (83 pages).

International Preliminary Report on Patentability for PCT/EP2023/060585 issued Oct. 29, 2024 (9 pages).

"Call for MPEG Immersive Video test materials", ISO/IEC JTC 1/SC 29/WG 04 N0170, Jan. 2022. International Organization for Standardization Organisation Internationale De Normalisation ISO/IEC JTC 1/SC 29/WG 04 MPEG Video Coding ISO/IEC JTC 1/SC 29/WG 04 N0170, Online, Jan. 2022 (9 pages).

Malik, J. et al., "Contour and texture analysis for image segmentation." International journal of computer vision 43, No. 1, Jul. 27, 2001 (21 pages).

Francois, E. et al., "Depth based segmentation" IEEE Trans. Circuits Syst. Video Technol, 7, 1997, pp. 237-239 (4 pages).

"Use cases and requirements for MIV—edition-2 (final)." International Organization for Standardization Organisation Internationale De Normalisation ISO/IEC JTC 1/SC 29/WG 2 MPEG Technical Requirements ISO/IEC JTC 1/SC 29/WG 2 N0157, Online—Jan. 2022 (7 pages).

Boyce, J. et al., "[MIV] New work areas for MIV v2" International Organization for Standardization Organisation Internationale De Normalisation ISO/IEC JTC 1/SC 29/WG 4 MPEG Video Coding ISO/IEC JTC 1/SC 29/WG 4 m58560-d2, Jan. 2022, online (3 pages).

"Information technology—coded representation of immersive media (MPEG—Immersive video)" Part 12, ISO/IEC/JTC1/SC29-23090-12:2021(E) (83 pages).

* cited by examiner

PROVIDING SEGMENTATION INFORMATION FOR IMMERSIVE VIDEO

CROSS-REFERENCE TO RELATED APPLICATION

This application is a national stage application under 35 U.S.C. § 371 of International Application No. PCT/EP2023/060585, entitled "PROVIDING SEGMENTATION INFORMATION FOR IMMERSIVE VIDEO," filed Apr. 24, 2023, which claims priority of European Patent Application No. EP22305627.6, filed 27 Apr. 2022, which are incorporated herein by reference in their entirety.

BACKGROUND

With the emergence of consumer Head Mounted Displays (Oculus, HTC Vive, etc.) associated with improved screen resolution, field of view as well as frame rate, Virtual Reality has gained more interest. Such a phenomenon especially opens the door to new kind of applications in numerous domains including gaming, education/training as well as multimedia.

In this domain, new kinds of video content have appeared, including 360° videos. Such videos allow the user to watch all around himself through pure rotations around a fixed point of view. Even if pure rotations are sufficient for a first omnidirectional video experience, they may quickly become frustrating for the viewer who would expect more freedom. In addition, such experiences may also induce dizziness, as head rotations include small translations of the head which are not reproduced by such experiences. FIG. 3 illustrates a rig of cameras that may be used to capture volumetric videos.

An alternative to these 360° contents is known as volumetric or 6 Degrees Of Freedom (6DoF) video. When watching such videos, in addition to rotations, the user can also translate his head inside the watched content and experience parallax. Such videos considerably increase the feeling of immersion and the perception of the scene depth but can also reduce dizziness by providing consistent visual feedback during head translations. The associated content may be created by the means of dedicated sensors allowing the simultaneous recording of the color and the geometry of the scene of interest. The use of rig of color cameras combined with photogrammetry techniques is one way to do this recording (FIG. 3).

While 360° videos may be a temporal succession of particular images resulting from the un-mapping of spherical textures (latlong/equirectangular images for instance), 6DoF video "frames" are more complex as they should embed the information from several point of views.

Two different kinds of volumetric videos may be considered depending on the viewing conditions. The more permissive one allows a complete free navigation inside the video content whereas a second one restricts the user viewing space to a limited volume. This latter context is a natural compromise between free navigation and passive viewing conditions of an audience member seated in his armchair. It is moreover conceivable in a shorter term than the free viewpoint scenario, and it requires less effort to acquire content (due to the restriction of the visualization box). One implementation of volumetric videos with limited viewing space is provided within MPEG as an extension of V3C called MPEG For Immersive Video (MIV), belonging to the MPEG-I standard suite. For V3C, see ISO/IEC 23090-5:2022(2E) Visual Volumetric Video-based Coding (V3C) and Video-based Point Cloud Compression (V-PCC). For MIV, see ISO/IEC 23090-12:2022 MPEG Immersive Video.

The current MIV allows for carrying the volumetric information as a combination of 2D patches stored in atlas frames (FIGS. 4A-4B) which are then "video" encoded making use of regular codecs (often HEVC). Each patch typically represents the projection of a subpart of the 3D input scene as a combination of color, geometry and transparency 2D attributes, and the set of all patches is designed at the encoding stage to "cover" the entire scene while avoiding redundancy where possible. At the decoding stage, the atlases are "video" decoded and the patches are rendered in a view synthesis process to recover the viewport associated to a desired viewing position.

FIG. 4A illustrates an example of a color atlas generated using MIV. FIG. 4B illustrates a corresponding geometry atlas.

In the first edition of MIV, the texture (color) and geometry (depth) components of an encoded volumetric video are spatially aligned. This assumes that the input multiview plus depth (MVD) content to the MIV encoder, which consists of a multiplicity of views, captured by real or virtual cameras, associated with depth maps, is such that the texture (color) images and the depth map of a given view share the same camera parameters.

At the MPEG 137 meeting (January 2022), it was proposed that the second edition of MIV in preparation would support content in which texture and depth components are not necessarily aligned (e.g., in which they are captured by separate input devices). See Jill Boyce, Basel Salahieh, "New work areas for MIV v2", ISO/IEC JTC 1/SC 29/WG 4 m58560, January 2022. See also "Use cases and requirements for MIV. Edition-2", ISO/IEC JTC 1/SC 29/WG 2 N00157, January 2022.

SUMMARY

Embodiments described herein include methods that are used in video encoding and decoding (collectively "coding"). In a method according to some embodiments, a plurality of source views of a scene are obtained. For at least one of the source views, segmentation information is obtained associating each of a plurality of regions of the source view with a respective entity. The plurality of source views are encoded as an immersive video comprising a plurality of patches, the patches being segmented according to the segmentation information. Information is also encoded indicating which of the source views are associated with the segmentation information used to segment the patches.

Embodiments described herein further include an apparatus comprising one or more processors configured to perform a method as follows. A plurality of source views of a scene are obtained. For at least one of the source views, segmentation information is obtained associating each of a plurality of regions of the source view with a respective entity. The plurality of source views are encoded as an immersive video comprising a plurality of patches, the patches being segmented according to the segmentation information. Information is also encoded indicating which of the source views are associated with the segmentation information used to segment the patches.

In some embodiments, the information indicating which of the source views are associated with the segmentation information used to segment the patches comprises, for each source view, a flag indicating whether that input view is associated with segmentation information used to segment the patches.

In some embodiments, the segmentation information associated with a source view comprises an entity map associated with the source view.

In some embodiments, the information indicating which of the source views are associated with the segmentation information used to segment the patches comprises information indicating whether the segmentation information is based on a depth image or on a texture image.

In a method according to some embodiments, an encoded immersive video is obtained comprising a plurality of patches, the video representing a plurality of input views of a scene. Information is obtained indicating which of the input views are associated with segmentation information used to segment the patches. The immersive video is rendered according to the information indicating which of the input views are associated with segmentation information used to segment the patches.

In an apparatus according to some embodiments, the apparatus comprises one or more processors configured to perform a method as follows. An encoded immersive video is obtained comprising a plurality of patches, the video representing a plurality of input views of a scene. Information is obtained indicating which of the input views are associated with segmentation information used to segment the patches. The immersive video is rendered according to the information indicating which of the input views are associated with segmentation information used to segment the patches.

In some embodiments, the information indicating which of the source views are associated with the segmentation information used to segment the patches comprises, for each source view, a flag indicating whether that input view is associated with segmentation information used to segment the patches. In some embodiments, the information indicating which of the source views are associated with the segmentation information used to segment the patches comprises information indicating whether the segmentation information is based on a depth image or on a texture image.

In some embodiments, rendering the immersive video according to the information indicating which of the input views are associated with segmentation information used to segment the patches comprises identifying at least one selected entity to be rendered; and in response to a determination that the segmentation information is based on a depth image, performing warping of depth pixels of the immersive video only for depth patches that are associated with the at least one selected entity.

In some embodiments, rendering the immersive video according to the information indicating which of the input views are associated with segmentation information used to segment the patches comprises identifying at least one selected entity to be rendered; and in response to a determination that the segmentation information is based on a texture image: performing warping of depth pixels of the immersive video for depth patches including at least depth patches that are associated with the at least one selected entity; and performing blending of color values based only on color pixels that are associated with the at least one selected entity.

In some embodiments, rendering the immersive video according to the information indicating which of the input views are associated with segmentation information used to segment the patches comprises, in response to a determination that the segmentation information is based on a depth image, making a visibility determination based at least in part on the segmentation information.

In some embodiments, rendering the immersive video according to the information indicating which of the input views are associated with segmentation information used to segment the patches comprises, in response to a determination that the segmentation information is based on a texture image, making a visibility determination during a blending stage based at least in part on the segmentation information.

A signal according to some embodiments comprises an encoded immersive video comprising a plurality of patches, the video representing a plurality of input views of a scene; and information indicating which of the input views are associated with segmentation information used to segment the patches. In some such embodiments, the information indicating which of the source views are associated with the segmentation information used to segment the patches comprises, for each source view, a flag indicating whether that input view is associated with segmentation information used to segment the patches.

Some embodiments include a computer-readable medium storing a signal as described herein.

Some embodiments include a computer-readable medium including instructions for causing one or more processors to perform a method as described herein.

Some embodiments include a computer program product including instructions which, when the program is executed by one or more processors, causes the one or more processors to carry out a method as described herein.

BRIEF DESCRIPTION OF THE DRAWINGS

FIG. 9A illustrates a smartphone. FIG. 9B illustrates a depth camera.

EXAMPLE NETWORKS FOR IMPLEMENTATION OF THE EMBODIMENTS

Figure 1A:
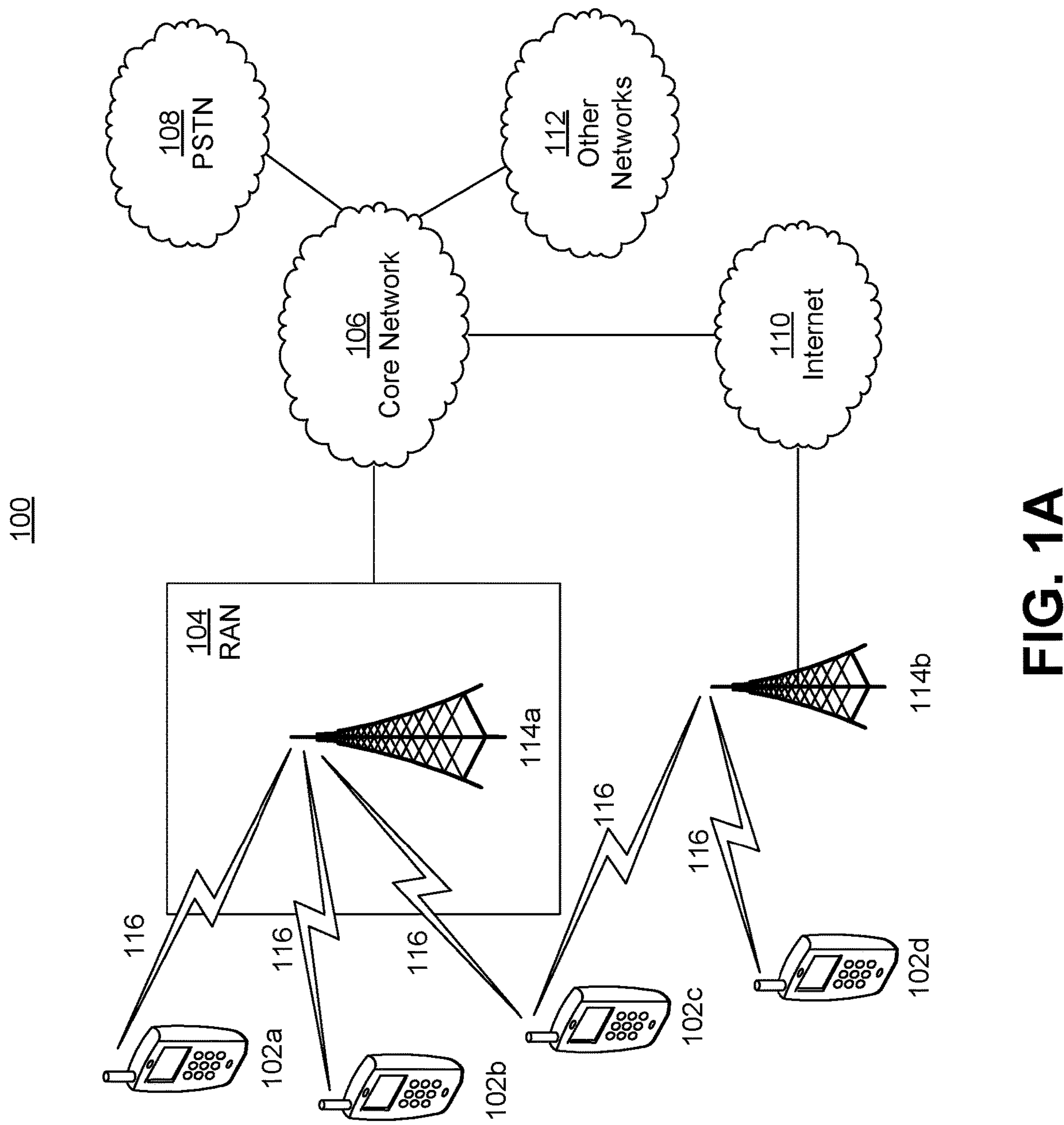
FIG. 1A is a system diagram illustrating an example communications system in which one or more disclosed embodiments may be implemented.

FIG. 1A is a diagram illustrating an example communications system 100 in which one or more disclosed embodiments may be implemented. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), zero-tail unique-word DFT-Spread OFDM (ZT UW DTS-s OFDM), unique word OFDM (UW-OFDM), resource block-filtered OFDM, filter bank multicarrier (FBMC), and the like.

As shown in FIG. 1A, the communications system 100 may include wireless transmit/receive units (WTRUs) 102*a*, 102*b*, 102*c*, 102*d*, a RAN 104, a CN 106, a public switched telephone network (PSTN) 108, the Internet 110, and other networks 112, though it will be appreciated that the disclosed embodiments contemplate any number of WTRUs, base stations, networks, and/or network elements. Each of the WTRUs 102*a*, 102*b*, 102*c*, 102*d* may be any type of device configured to operate and/or communicate in a wireless environment. By way of example, the WTRUs 102*a*, 102*b*, 102*c*, 102*d*, any of which may be referred to as a "station" and/or a "STA", may be configured to transmit and/or receive wireless signals and may include a user equipment (UE), a mobile station, a fixed or mobile subscriber unit, a subscription-based unit, a pager, a cellular telephone, a personal digital assistant (PDA), a smartphone, a laptop, a netbook, a personal computer, a wireless sensor, a hotspot or Mi-Fi device, an Internet of Things (IoT) device, a watch or other wearable, a head-mounted display (HMD), a vehicle, a drone, a medical device and applications (e.g., remote surgery), an industrial device and applications (e.g., a robot and/or other wireless devices operating in an industrial and/or an automated processing chain contexts), a consumer electronics device, a device operating on commercial and/or industrial wireless networks, and the like. Any of the WTRUs 102*a*, 102*b*, 102*c* and 102*d* may be interchangeably referred to as a UE.

The communications systems 100 may also include a base station 114*a* and/or a base station 114*b*. Each of the base stations 114*a*, 114*b* may be any type of device configured to wirelessly interface with at least one of the WTRUs 102*a*, 102*b*, 102*c*, 102*d* to facilitate access to one or more communication networks, such as the CN 106, the Internet 110, and/or the other networks 112. By way of example, the base stations 114*a*, 114*b* may be a base transceiver station (BTS), a Node-B, an eNode B, a Home Node B, a Home eNode B, a gNB, a NR NodeB, a site controller, an access point (AP), a wireless router, and the like. While the base stations 114*a*, 114*b* are each depicted as a single element, it will be appreciated that the base stations 114*a*, 114*b* may include any number of interconnected base stations and/or network elements.

The base station 114*a* may be part of the RAN 104, which may also include other base stations and/or network elements (not shown), such as a base station controller (BSC), a radio network controller (RNC), relay nodes, etc. The base station 114*a* and/or the base station 114*b* may be configured to transmit and/or receive wireless signals on one or more carrier frequencies, which may be referred to as a cell (not shown). These frequencies may be in licensed spectrum, unlicensed spectrum, or a combination of licensed and unlicensed spectrum. A cell may provide coverage for a wireless service to a specific geographical area that may be relatively fixed or that may change over time. The cell may further be divided into cell sectors. For example, the cell associated with the base station 114*a* may be divided into three sectors. Thus, in one embodiment, the base station 114*a* may include three transceivers, i.e., one for each sector of the cell. In an embodiment, the base station 114*a* may employ multiple-input multiple output (MIMO) technology and may utilize multiple transceivers for each sector of the cell. For example, beamforming may be used to transmit and/or receive signals in desired spatial directions.

The base stations 114*a*, 114*b* may communicate with one or more of the WTRUs 102*a*, 102*b*, 102*c*, 102*d* over an air interface 116, which may be any suitable wireless communication link (e.g., radio frequency (RF), microwave, centimeter wave, micrometer wave, infrared (IR), ultraviolet (UV), visible light, etc.). The air interface 116 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114*a* in the RAN 104 and the WTRUs 102*a*, 102*b*, 102*c* may implement a radio technology such as Universal Mobile Telecommunications System (UMTS) Terrestrial Radio Access (UTRA), which may establish the air interface 116 using wideband CDMA (WCDMA). WCDMA may include communication protocols such as High-Speed Packet Access (HSPA) and/or Evolved HSPA (HSPA+). HSPA may include High-Speed Downlink (DL) Packet Access (HSDPA) and/or High-Speed UL Packet Access (HSUPA).

In an embodiment, the base station 114*a* and the WTRUs 102*a*, 102*b*, 102*c* may implement a radio technology such as Evolved UMTS Terrestrial Radio Access (E-UTRA), which may establish the air interface 116 using Long Term Evolution (LTE) and/or LTE-Advanced (LTE-A) and/or LTE-Advanced Pro (LTE-A Pro).

In an embodiment, the base station 114*a* and the WTRUs 102*a*, 102*b*, 102*c* may implement a radio technology such as NR Radio Access, which may establish the air interface 116 using New Radio (NR).

In an embodiment, the base station 114*a* and the WTRUs 102*a*, 102*b*, 102*c* may implement multiple radio access technologies. For example, the base station 114*a* and the WTRUs 102*a*, 102*b*, 102*c* may implement LTE radio access and NR radio access together, for instance using dual connectivity (DC) principles. Thus, the air interface utilized by WTRUs 102*a*, 102*b*, 102*c* may be characterized by multiple types of radio access technologies and/or transmissions sent to/from multiple types of base stations (e.g., a eNB and a gNB).

In other embodiments, the base station 114*a* and the WTRUs 102*a*, 102*b*, 102*c* may implement radio technologies such as IEEE 802.11 (i.e., Wireless Fidelity (WiFi), IEEE 802.16 (i.e., Worldwide Interoperability for Microwave Access (WiMAX)), CDMA2000, CDMA2000 1×, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114*b* in FIG. 1A may be a wireless router, Home Node B, Home eNode B, or access point, for example, and may utilize any suitable RAT for facilitating wireless connectivity in a localized area, such as a place of business, a home, a vehicle, a campus, an industrial facility, an air corridor (e.g., for use by drones), a roadway, and the like. In one embodiment, the base station 114*b* and the WTRUs 102*c*, 102*d* may implement a radio technology such as IEEE 802.11 to establish a wireless local area network (WLAN). In an embodiment, the base station 114*b* and the WTRUs 102*c*, 102*d* may implement a radio technology such as IEEE 802.15 to establish a wireless personal area network (WPAN). In yet another embodiment, the base station 114*b* and the WTRUs 102*c*, 102*d* may utilize a cellular-based RAT (e.g., WCDMA, CDMA2000, GSM, LTE, LTE-A, LTE-A Pro, NR etc.) to establish a picocell or femtocell. As shown in FIG. 1A, the base station 114*b* may have a direct connection to the Internet 110. Thus, the base station 114*b* may not be required to access the Internet 110 via the CN 106.

The RAN 104 may be in communication with the CN 106, which may be any type of network configured to provide voice, data, applications, and/or voice over internet protocol (VoIP) services to one or more of the WTRUs 102*a*, 102*b*, 102*c*, 102*d*. The data may have varying quality of service (QoS) requirements, such as differing throughput requirements, latency requirements, error tolerance requirements, reliability requirements, data throughput requirements, mobility requirements, and the like. The CN 106 may provide call control, billing services, mobile location-based services, pre-paid calling, Internet connectivity, video distribution, etc., and/or perform high-level security functions, such as user authentication. Although not shown in FIG. 1A, it will be appreciated that the RAN 104 and/or the CN 106 may be in direct or indirect communication with other RANs that employ the same RAT as the RAN 104 or a different RAT. For example, in addition to being connected to the RAN 104, which may be utilizing a NR radio technology, the CN 106 may also be in communication with another RAN (not shown) employing a GSM, UMTS, CDMA 2000, WiMAX, E-UTRA, or WiFi radio technology.

The CN 106 may also serve as a gateway for the WTRUs 102*a*, 102*b*, 102*c*, 102*d* to access the PSTN 108, the Internet 110, and/or the other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and/or the internet protocol (IP) in the TCP/IP internet protocol suite. The networks 112 may include wired and/or wireless communications networks owned and/or operated by other service providers. For example, the networks 112 may include another CN connected to one or more RANs, which may employ the same RAT as the RAN 104 or a different RAT.

Some or all of the WTRUs 102*a*, 102*b*, 102*c*, 102*d* in the communications system 100 may include multi-mode capabilities (e.g., the WTRUs 102*a*, 102*b*, 102*c*, 102*d* may include multiple transceivers for communicating with different wireless networks over different wireless links). For example, the WTRU 102*c* shown in FIG. 1A may be configured to communicate with the base station 114*a*, which may employ a cellular-based radio technology, and with the base station 114*b*, which may employ an IEEE 802 radio technology.

Figure 1B:
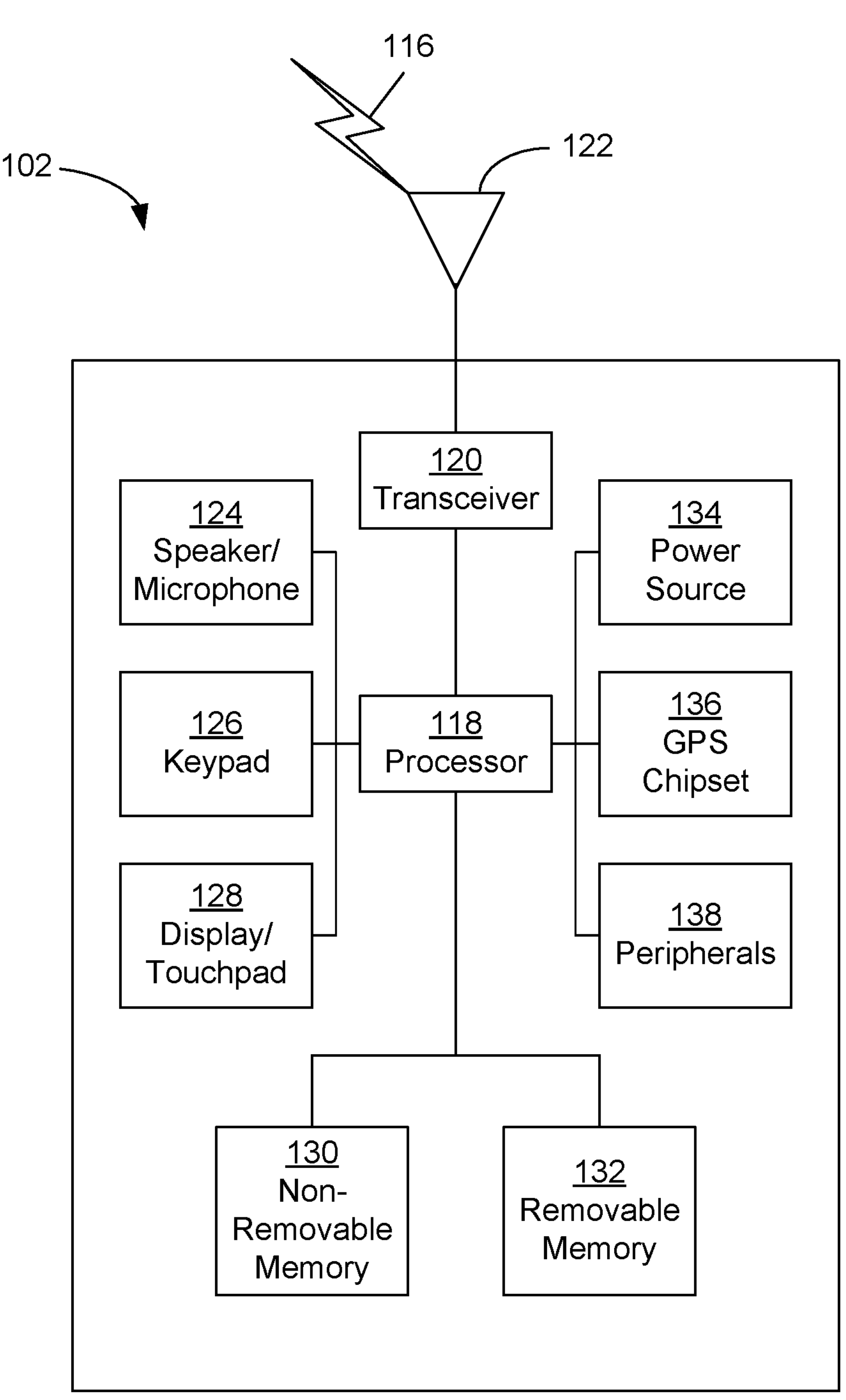
FIG. 1B is a system diagram illustrating an example wireless transmit/receive unit (WTRU) that may be used within the communications system illustrated in FIG. 1A according to an embodiment.

FIG. 1B is a system diagram illustrating an example WTRU 102. As shown in FIG. 1B, the WTRU 102 may include a processor 118, a transceiver 120, a transmit/receive element 122, a speaker/microphone 124, a keypad 126, a display/touchpad 128, non-removable memory 130, removable memory 132, a power source 134, a global positioning system (GPS) chipset 136, and/or other peripherals 138, among others. It will be appreciated that the WTRU 102 may include any sub-combination of the foregoing elements while remaining consistent with an embodiment.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114*a*) over the air interface 116. For example, in one embodiment, the transmit/receive element 122 may be an antenna configured to transmit and/or receive RF signals. In an embodiment, the transmit/receive element 122 may be an emitter/detector configured to transmit and/or receive IR, UV, or visible light signals, for example. In yet another embodiment, the transmit/receive element 122 may be configured to transmit and/or receive both RF and light signals. It will be appreciated that the transmit/receive element 122 may be configured to transmit and/or receive any combination of wireless signals.

Although the transmit/receive element 122 is depicted in FIG. 1B as a single element, the WTRU 102 may include any number of transmit/receive elements 122. More specifically, the WTRU 102 may employ MIMO technology. Thus, in one embodiment, the WTRU 102 may include two or more transmit/receive elements 122 (e.g., multiple antennas) for transmitting and receiving wireless signals over the air interface 116.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as NR and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 116 from a base station (e.g., base stations 114*a*, 114*b*) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs and/or video), a universal serial bus (USB) port, a vibration device, a television transceiver, a hands free headset, a Bluetooth® module, a frequency modulated (FM) radio unit, a digital music player, a media player, a video game player module, an Internet browser, a Virtual Reality and/or Augmented Reality (VR/AR) device, an activity tracker, and the like. The peripherals 138 may include one or more sensors, the sensors may be one or more of a gyroscope, an accelerometer, a hall effect sensor, a magnetometer, an orientation sensor, a proximity sensor, a temperature sensor, a time sensor; a geolocation sensor; an altimeter, a light sensor, a touch sensor, a magnetometer, a barometer, a gesture sensor, a biometric sensor, and/or a humidity sensor.

The WTRU 102 may include a full duplex radio for which transmission and reception of some or all of the signals (e.g., associated with particular subframes for both the UL (e.g., for transmission) and downlink (e.g., for reception) may be concurrent and/or simultaneous. The full duplex radio may include an interference management unit to reduce and or substantially eliminate self-interference via either hardware (e.g., a choke) or signal processing via a processor (e.g., a separate processor (not shown) or via processor 118). In an embodiment, the WRTU 102 may include a half-duplex radio for which transmission and reception of some or all of the signals (e.g., associated with particular subframes for either the UL (e.g., for transmission) or the downlink (e.g., for reception).

Although the WTRU is described in FIGS. 1A-1B as a wireless terminal, it is contemplated that in certain representative embodiments that such a terminal may use (e.g., temporarily or permanently) wired communication interfaces with the communication network.

In representative embodiments, the other network 112 may be a WLAN.

In view of FIGS. 1A-1B, and the corresponding description, one or more, or all, of the functions described herein may be performed by one or more emulation devices (not shown). The emulation devices may be one or more devices configured to emulate one or more, or all, of the functions described herein. For example, the emulation devices may be used to test other devices and/or to simulate network and/or WTRU functions.

The emulation devices may be designed to implement one or more tests of other devices in a lab environment and/or in an operator network environment. For example, the one or more emulation devices may perform the one or more, or all, functions while being fully or partially implemented and/or deployed as part of a wired and/or wireless communication network in order to test other devices within the communication network. The one or more emulation devices may perform the one or more, or all, functions while being temporarily implemented/deployed as part of a wired and/or wireless communication network. The emulation device may be directly coupled to another device for purposes of testing and/or may performing testing using over-the-air wireless communications.

The one or more emulation devices may perform the one or more, including all, functions while not being implemented/deployed as part of a wired and/or wireless communication network. For example, the emulation devices may be utilized in a testing scenario in a testing laboratory and/or a non-deployed (e.g., testing) wired and/or wireless communication network in order to implement testing of one or more components. The one or more emulation devices may be test equipment. Direct RF coupling and/or wireless communications via RF circuitry (e.g., which may include one or more antennas) may be used by the emulation devices to transmit and/or receive data.

Example Systems

Figure 1C:
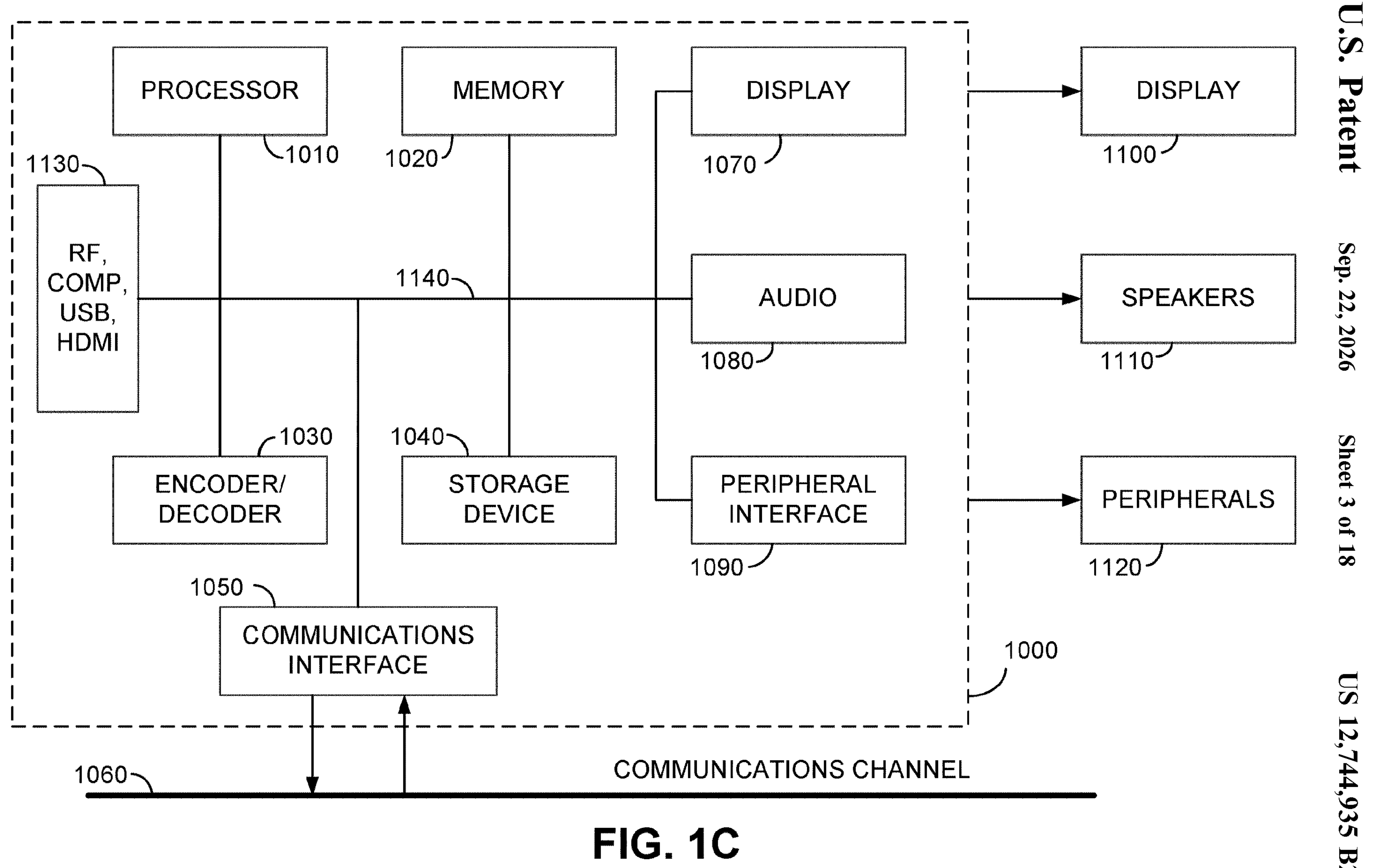
FIG. 1C is a functional block diagram of a system used in some embodiments described herein.

The embodiments described herein are not limited to being implemented on a WTRU. Such embodiments may be implemented using other systems, such as the system of FIG. 1C. FIG. 1C is a block diagram of an example of a system in which various aspects and embodiments are implemented. System 1000 can be embodied as a device including the various components described below and is configured to perform one or more of the aspects described in this document. Examples of such devices, include, but are not limited to, various electronic devices such as personal computers, laptop computers, smartphones, tablet computers, digital multimedia set top boxes, digital television receivers, personal video recording systems, connected home appliances, and servers. Elements of system 1000, singly or in combination, can be embodied in a single integrated circuit (IC), multiple ICs, and/or discrete components. For example, in at least one embodiment, the processing and encoder/decoder elements of system 1000 are distributed across multiple ICs and/or discrete components. In various embodiments, the system 1000 is communicatively coupled to one or more other systems, or other electronic devices, via, for example, a communications bus or through dedicated input and/or output ports. In various embodiments, the system 1000 is configured to implement one or more of the aspects described in this document.

The system 1000 includes at least one processor 1010 configured to execute instructions loaded therein for implementing, for example, the various aspects described in this document. Processor 1010 can include embedded memory, input output interface, and various other circuitries as known in the art. The system 1000 includes at least one memory 1020 (e.g., a volatile memory device, and/or a non-volatile memory device). System 1000 includes a storage device 1040, which can include non-volatile memory and/or volatile memory, including, but not limited to, Electrically Erasable Programmable Read-Only Memory (EEPROM), Read-Only Memory (ROM), Programmable Read-Only Memory (PROM), Random Access Memory (RAM), Dynamic Random Access Memory (DRAM), Static Random Access Memory (SRAM), flash, magnetic disk drive, and/or optical disk drive. The storage device 1040 can include an internal storage device, an attached storage device (including detachable and non-detachable storage devices), and/or a network accessible storage device, as non-limiting examples.

System 1000 includes an encoder/decoder module 1030 configured, for example, to process data to provide an encoded video or decoded video, and the encoder/decoder module 1030 can include its own processor and memory. The encoder/decoder module 1030 represents module(s) that can be included in a device to perform the encoding and/or decoding functions. As is known, a device can include one or both of the encoding and decoding modules. Additionally, encoder/decoder module 1030 can be implemented as a separate element of system 1000 or can be incorporated within processor 1010 as a combination of hardware and software as known to those skilled in the art.

Program code to be loaded onto processor 1010 or encoder/decoder 1030 to perform the various aspects described in this document can be stored in storage device 1040 and subsequently loaded onto memory 1020 for execution by processor 1010. In accordance with various embodiments, one or more of processor 1010, memory 1020, storage device 1040, and encoder/decoder module 1030 can store one or more of various items during the performance of the processes described in this document. Such stored items can include, but are not limited to, the input video, the decoded video or portions of the decoded video, the bitstream, matrices, variables, and intermediate or final results from the processing of equations, formulas, operations, and operational logic.

In some embodiments, memory inside of the processor 1010 and/or the encoder/decoder module 1030 is used to store instructions and to provide working memory for processing that is needed during encoding or decoding. In other embodiments, however, a memory external to the processing device (for example, the processing device can be either the processor 1010 or the encoder/decoder module 1030) is used for one or more of these functions. The external memory can be the memory 1020 and/or the storage device 1040, for example, a dynamic volatile memory and/or a non-volatile flash memory. In several embodiments, an external non-volatile flash memory is used to store the operating system of, for example, a television. In at least one embodiment, a fast external dynamic volatile memory such as a RAM is used as working memory for video coding and decoding operations, such as for MPEG-2 (MPEG refers to the Moving Picture Experts Group, MPEG-2 is also referred to as ISO/IEC 13818, and 13818-1 is also known as H.222, and 13818-2 is also known as H.262), HEVC (HEVC refers to High Efficiency Video Coding, also known as H.265 and MPEG-H Part 2), or VVC (Versatile Video Coding, a new standard being developed by JVET, the Joint Video Experts Team).

The input to the elements of system 1000 can be provided through various input devices as indicated in block 1130. Such input devices include, but are not limited to, (i) a radio frequency (RF) portion that receives an RF signal transmitted, for example, over the air by a broadcaster, (ii) a Component (COMP) input terminal (or a set of COMP input terminals), (iii) a Universal Serial Bus (USB) input terminal, and/or (iv) a High Definition Multimedia Interface (HDMI) input terminal. Other examples, not shown in FIG. 1C, include composite video.

In various embodiments, the input devices of block 1130 have associated respective input processing elements as known in the art. For example, the RF portion can be associated with elements suitable for (i) selecting a desired frequency (also referred to as selecting a signal, or band-limiting a signal to a band of frequencies), (ii) downconverting the selected signal, (iii) band-limiting again to a narrower band of frequencies to select (for example) a signal frequency band which can be referred to as a channel in certain embodiments, (iv) demodulating the downconverted and band-limited signal, (v) performing error correction, and (vi) demultiplexing to select the desired stream of data packets. The RF portion of various embodiments includes one or more elements to perform these functions, for example, frequency selectors, signal selectors, band-limiters, channel selectors, filters, downconverters, demodulators, error correctors, and demultiplexers. The RF portion can include a tuner that performs various of these functions, including, for example, downconverting the received signal to a lower frequency (for example, an intermediate frequency or a near-baseband frequency) or to baseband. In one set-top box embodiment, the RF portion and its associated input processing element receives an RF signal transmitted over a wired (for example, cable) medium, and performs frequency selection by filtering, downconverting, and filtering again to a desired frequency band. Various embodiments rearrange the order of the above-described (and other) elements, remove some of these elements, and/or add other elements performing similar or different functions. Adding elements can include inserting elements in between existing elements, such as, for example, inserting amplifiers and an analog-to-digital converter. In various embodiments, the RF portion includes an antenna.

Additionally, the USB and/or HDMI terminals can include respective interface processors for connecting system 1000 to other electronic devices across USB and/or HDMI connections. It is to be understood that various aspects of input processing, for example, Reed-Solomon error correction, can be implemented, for example, within a separate input processing IC or within processor 1010 as necessary. Similarly, aspects of USB or HDMI interface processing can be implemented within separate interface ICs or within processor 1010 as necessary. The demodulated, error corrected, and demultiplexed stream is provided to various processing elements, including, for example, processor 1010, and encoder/decoder 1030 operating in combination with the memory and storage elements to process the datastream as necessary for presentation on an output device.

Various elements of system 1000 can be provided within an integrated housing, Within the integrated housing, the various elements can be interconnected and transmit data therebetween using suitable connection arrangement 1140, for example, an internal bus as known in the art, including the Inter-IC (I2C) bus, wiring, and printed circuit boards.

The system 1000 includes communication interface 1050 that enables communication with other devices via communication channel 1060. The communication interface 1050 can include, but is not limited to, a transceiver configured to transmit and to receive data over communication channel 1060. The communication interface 1050 can include, but is not limited to, a modem or network card and the communication channel 1060 can be implemented, for example, within a wired and/or a wireless medium.

Data is streamed, or otherwise provided, to the system 1000, in various embodiments, using a wireless network such as a Wi-Fi network, for example IEEE 802.11 (IEEE refers to the Institute of Electrical and Electronics Engineers). The Wi-Fi signal of these embodiments is received over the communications channel 1060 and the communications interface 1050 which are adapted for Wi-Fi communications. The communications channel 1060 of these embodiments is typically connected to an access point or router that provides access to external networks including the Internet for allowing streaming applications and other over-the-top communications. Other embodiments provide streamed data to the system 1000 using a set-top box that delivers the data over the HDMI connection of the input block 1130. Still other embodiments provide streamed data to the system 1000 using the RF connection of the input block 1130. As indicated above, various embodiments provide data in a non-streaming manner. Additionally, various embodiments use wireless networks other than Wi-Fi, for example a cellular network or a Bluetooth network.

The system 1000 can provide an output signal to various output devices, including a display 1100, speakers 1110, and other peripheral devices 1120. The display 1100 of various embodiments includes one or more of, for example, a touchscreen display, an organic light-emitting diode (OLED) display, a curved display, and/or a foldable display. The display 1100 can be for a television, a tablet, a laptop, a cell phone (mobile phone), or other device. The display 1100 can also be integrated with other components (for example, as in a smart phone), or separate (for example, an external monitor for a laptop). The other peripheral devices 1120 include, in various examples of embodiments, one or more of a stand-alone digital video disc (or digital versatile disc) (DVR, for both terms), a disk player, a stereo system, and/or a lighting system. Various embodiments use one or more peripheral devices 1120 that provide a function based on the output of the system 1000. For example, a disk player performs the function of playing the output of the system 1000.

In various embodiments, control signals are communicated between the system 1000 and the display 1100, speakers 1110, or other peripheral devices 1120 using signaling such as AV.Link, Consumer Electronics Control (CEC), or other communications protocols that enable device-to-device control with or without user intervention. The output devices can be communicatively coupled to system 1000 via dedicated connections through respective interfaces 1070, 1080, and 1090. Alternatively, the output devices can be connected to system 1000 using the communications channel 1060 via the communications interface 1050. The display 1100 and speakers 1110 can be integrated in a single unit with the other components of system 1000 in an electronic device such as, for example, a television. In various embodiments, the display interface 1070 includes a display driver, such as, for example, a timing controller (T Con) chip.

The display 1100 and speaker 1110 can alternatively be separate from one or more of the other components, for example, if the RF portion of input 1130 is part of a separate set-top box. In various embodiments in which the display 1100 and speakers 1110 are external components, the output signal can be provided via dedicated output connections, including, for example, HDMI ports, USB ports, or COMP outputs.

The embodiments can be carried out by computer software implemented by the processor 1010 or by hardware, or by a combination of hardware and software. As a non-limiting example, the embodiments can be implemented by one or more integrated circuits. The memory 1020 can be of any type appropriate to the technical environment and can be implemented using any appropriate data storage technology, such as optical memory devices, magnetic memory devices, semiconductor-based memory devices, fixed memory, and removable memory, as non-limiting examples. The processor 1010 can be of any type appropriate to the technical environment, and can encompass one or more of microprocessors, general purpose computers, special purpose computers, and processors based on a multi-core architecture, as non-limiting examples.

DETAILED DESCRIPTION

Block-Based Video Coding

Figure 2A:
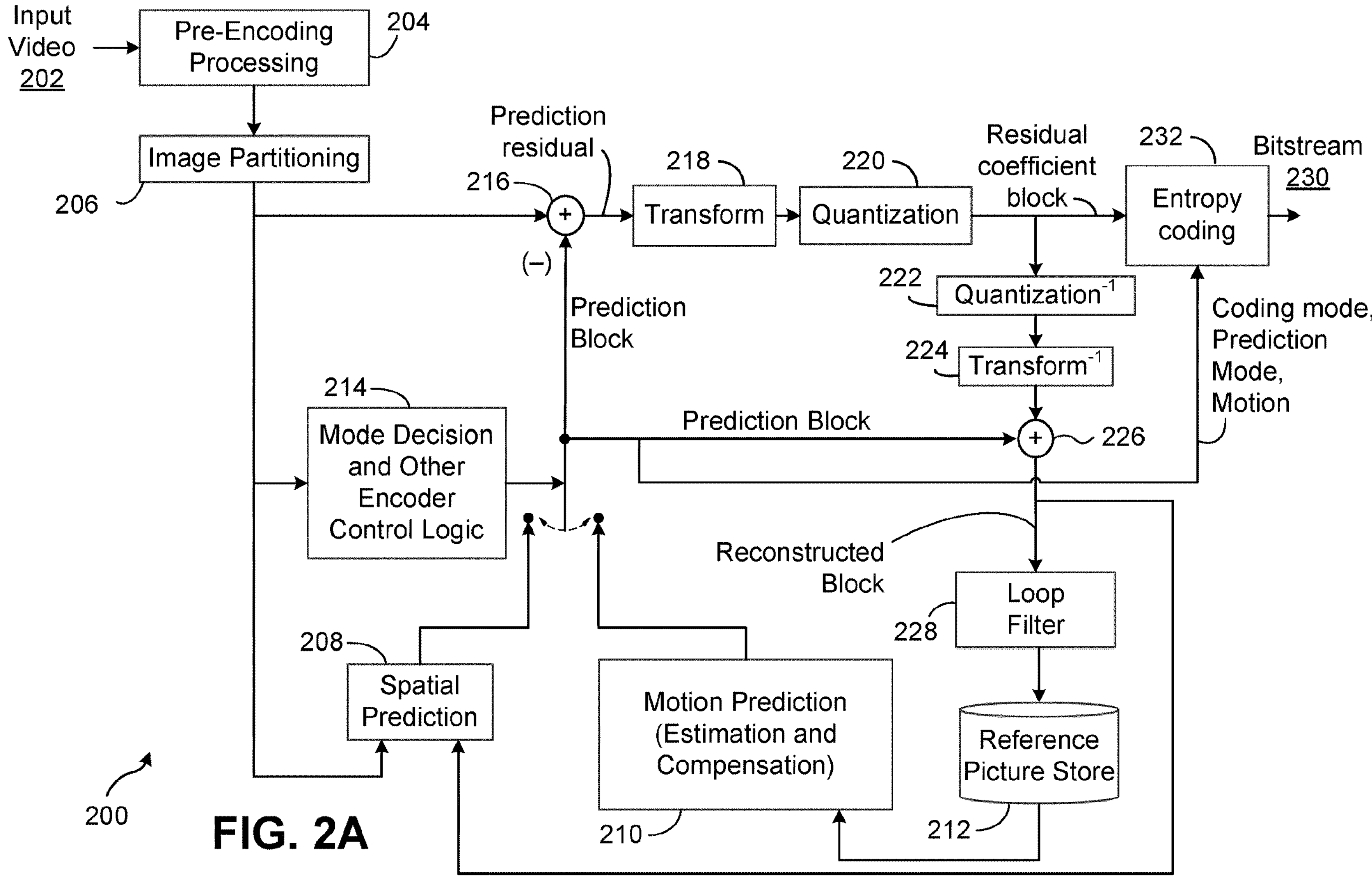
FIG. 2A is a functional block diagram of block-based video encoder, such as an encoder used for WC.

Like HEVC, the WVC is built upon the block-based hybrid video coding framework. FIG. 2A gives the block diagram of a block-based hybrid video encoding system 200. Variations of this encoder 200 are contemplated, but the encoder 200 is described below for purposes of clarity without describing all expected variations.

Before being encoded, a video sequence may go through pre-encoding processing (204), for example, applying a color transform to an input color picture (e.g., conversion from RGB 4:4:4 to YCbCr 4:2:0), or performing a remapping of the input picture components in order to get a signal distribution more resilient to compression (for instance using a histogram equalization of one of the color components). Metadata can be associated with the pre-processing and attached to the bitstream.

The input video signal 202 including a picture to be encoded is partitioned (206) and processed block by block in units of, for example, CUs. Different CUs may have different sizes. In VTM-1.0, a CU can be up to 128×128 pixels. However, different from the HEVC which partitions blocks only based on quad-trees, in the VTM-1.0, a coding tree unit (CTU) is split into CUs to adapt to varying local characteristics based on quad/binary/ternary-tree. Additionally, the concept of multiple partition unit type in the HEVC is removed, such that the separation of CU, prediction unit (PU) and transform unit (TU) does not exist in the VVC-1.0 anymore; instead, each CU is always used as the basic unit for both prediction and transform without further partitions. In the multi-type tree structure, a CTU is firstly partitioned by a quad-tree structure. Then, each quad-tree leaf node can be further partitioned by a binary and ternary tree structure. Different splitting types may be used, such as quaternary partitioning, vertical binary partitioning, horizontal binary partitioning, vertical ternary partitioning, and horizontal ternary partitioning.

In the encoder of FIG. 2A, spatial prediction (208) and/or temporal prediction (210) may be performed. Spatial prediction (or "intra prediction") uses pixels from the samples of already coded neighboring blocks (which are called reference samples) in the same video picture/slice to predict the current video block. Spatial prediction reduces spatial redundancy inherent in the video signal. Temporal prediction (also referred to as "inter prediction" or "motion compensated prediction") uses reconstructed pixels from the already coded video pictures to predict the current video block. Temporal prediction reduces temporal redundancy inherent in the video signal. A temporal prediction signal for a given CU may be signaled by one or more motion vectors (MVs) which indicate the amount and the direction of motion between the current CU and its temporal reference. Also, if multiple reference pictures are supported, a reference picture index may additionally be sent, which is used to identify from which reference picture in the reference picture store (212) the temporal prediction signal comes.

The mode decision block (214) in the encoder chooses the best prediction mode, for example based on a rate-distortion optimization method. This selection may be made after spatial and/or temporal prediction is performed. The intra/inter decision may be indicated by, for example, a prediction mode flag. The prediction block is subtracted from the current video block (216) to generate a prediction residual. The prediction residual is de-correlated using transform (218) and quantized (220). (For some blocks, the encoder may bypass both transform and quantization, in which case the residual may be coded directly without the application of the transform or quantization processes.) The quantized residual coefficients are inverse quantized (222) and inverse transformed (224) to form the reconstructed residual, which is then added back to the prediction block (226) to form the reconstructed signal of the CU. Further in-loop filtering, such as deblocking/SAO (Sample Adaptive Offset) filtering, may be applied (228) on the reconstructed CU to reduce encoding artifacts before it is put in the reference picture store (212) and used to code future video blocks. To form the output video bit-stream 230, coding mode (inter or intra), prediction mode information, motion information, and quantized residual coefficients are all sent to the entropy coding unit (108) to be further compressed and packed to form the bit-stream.

Figure 2B:
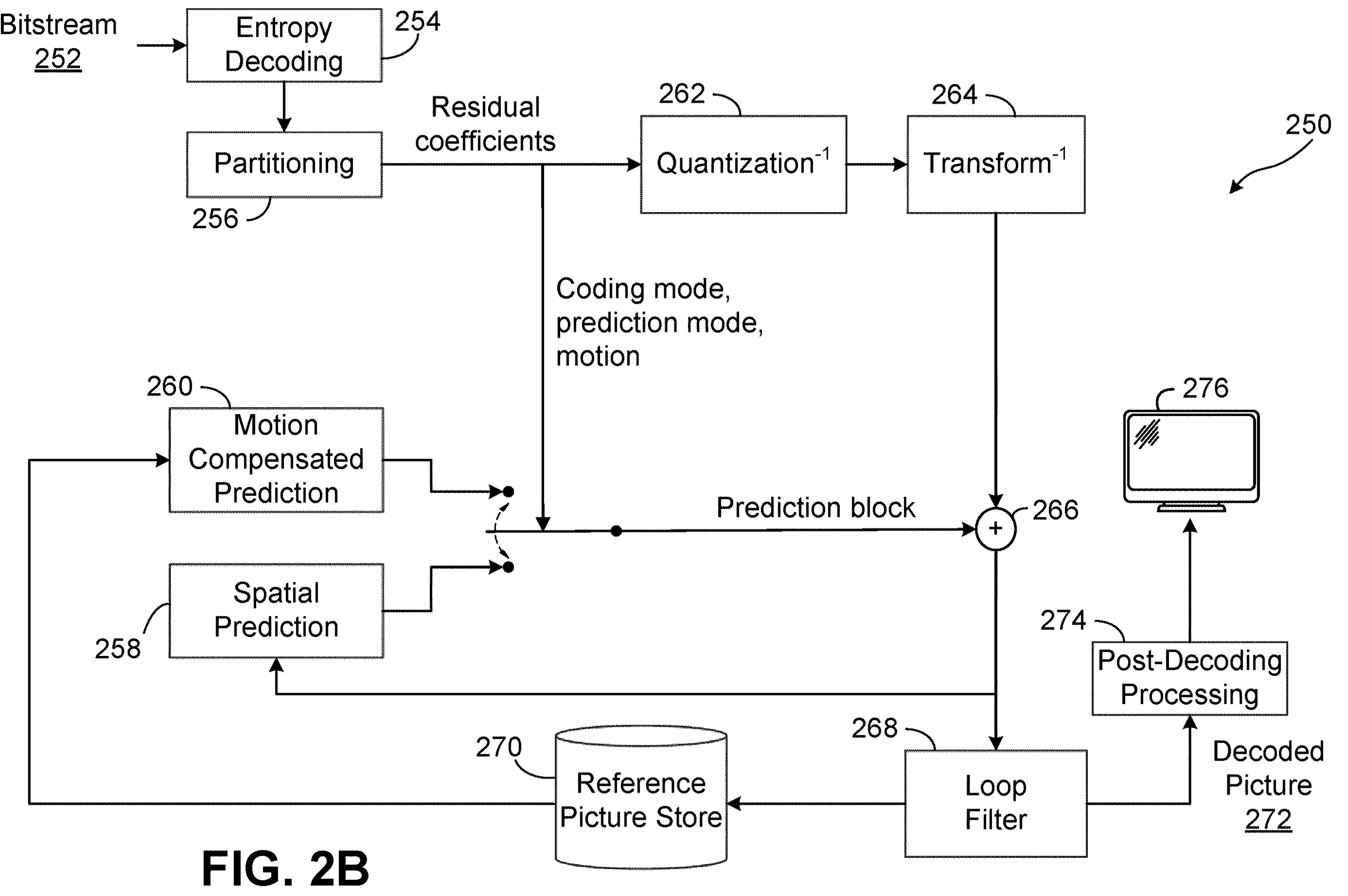
FIG. 2B is a functional block diagram of a block-based video decoder, such as a decoder used for WVC.
Figure 3:
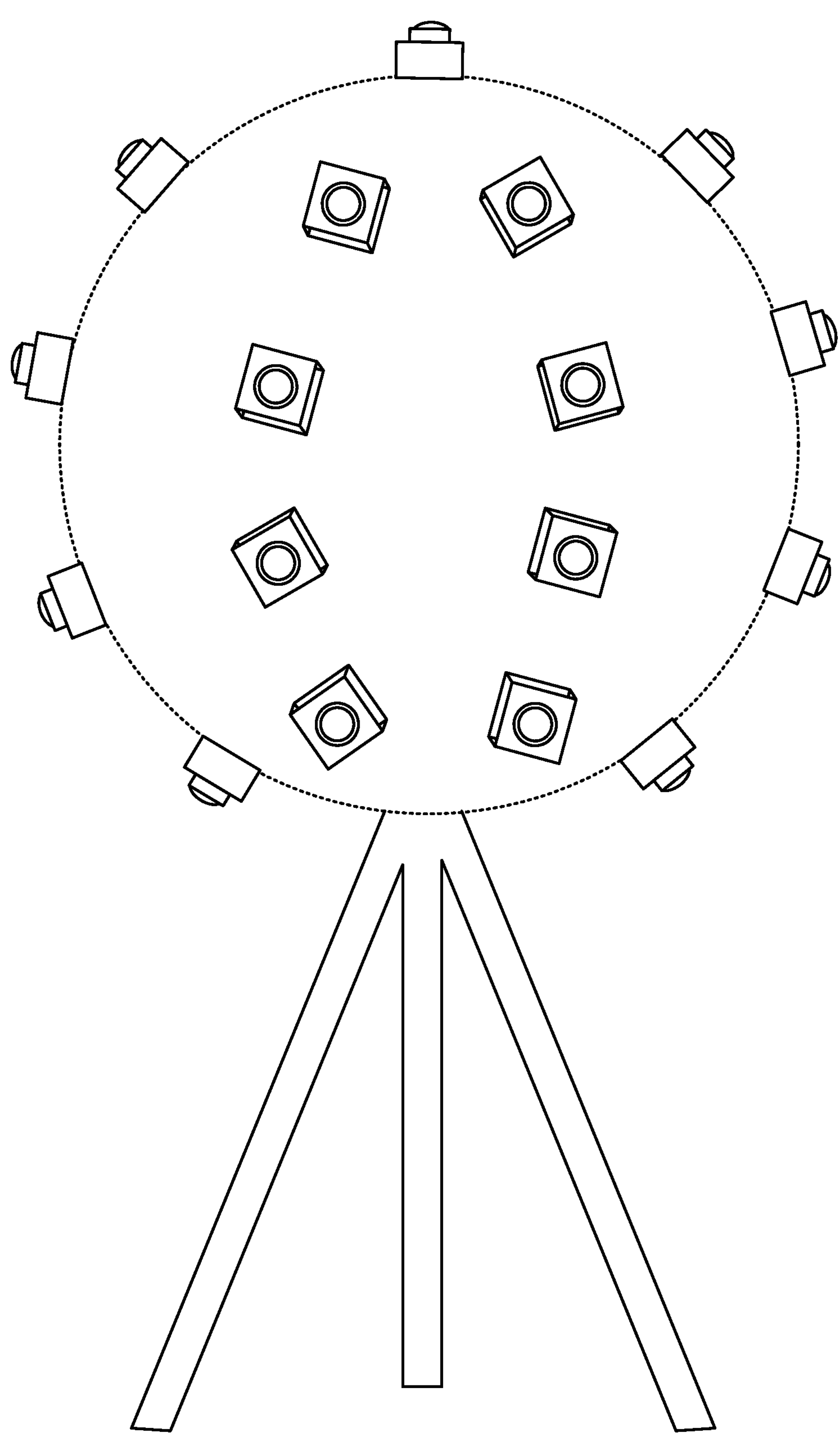
FIG. 3 illustrates a rig of cameras that may be used to capture volumetric videos.
Figure 4A:
FIG. 4A illustrates an example of a color atlas generated using MIV.
Figure 4B:
FIG. 4B illustrates a corresponding geometry atlas.

FIG. 2B gives a block diagram of a block-based video decoder 250. In the decoder 250, a bitstream is decoded by the decoder elements as described below. Video decoder 250 generally performs a decoding pass reciprocal to the encoding pass as described in FIG. 2A. The encoder 200 also generally performs video decoding as part of encoding video data.

In particular, the input of the decoder includes a video bitstream 252, which can be generated by video encoder 200. The video bit-stream 252 is first unpacked and entropy decoded at entropy decoding unit 254 to obtain transform coefficients, motion vectors, and other coded information. Picture partition information indicates how the picture is partitioned. The decoder may therefore divide (256) the picture according to the decoded picture partitioning information. The coding mode and prediction information are sent to either the spatial prediction unit 258 (if intra coded) or the temporal prediction unit 260 (if inter coded) to form the prediction block. The residual transform coefficients are sent to inverse quantization unit 262 and inverse transform unit 264 to reconstruct the residual block. The prediction block and the residual block are then added together at 266 to generate the reconstructed block. The reconstructed block may further go through in-loop filtering 268 before it is stored in reference picture store 270 for use in predicting future video blocks.

The decoded picture 272 may further go through post-decoding processing (274), for example, an inverse color transform (e.g. conversion from YCbCr 4:2:0 to RGB 4:4:4) or an inverse remapping performing the inverse of the remapping process performed in the pre-encoding processing (204). The post-decoding processing can use metadata derived in the pre-encoding processing and signaled in the bitstream. The decoded, processed video may be sent to a display device 276. The display device 276 may be a separate device from the decoder 250, or the decoder 250 and the display device 276 may be components of the same device.

Various methods and other aspects described in this disclosure can be used to modify modules of a video encoder 200 or decoder 250. Moreover, the systems and methods disclosed herein are not limited to VVC or HEVC, and can be applied, for example, to other standards and recommendations, whether pre-existing or future-developed, and extensions of any such standards and recommendations (including VVC and HEVC). Unless indicated otherwise, or technically precluded, the aspects described in this disclosure can be used individually or in combination.

Example Immersive Video Coding

Some immersive video coding techniques, such as MIV, receive as input a collection of views referred to as MVD views, standing for Multi View plus Depth. Such content may be computer graphics or it may be natural content. In such content, both texture and depth information may be available for every pixel of each view.

In some immersive video coding techniques, segmentation information may be provided in the form of entity maps, where each pixel is associated with a given integer value associated with a given object. This allows objects of the scene to be tagged at the encoder side. An example is described in the section "8.3.2.7 Patch data unit MIV extension syntax" of ISO/IEC 23090-12:2021. Such entity map information allows, for instance, object filtering at decoder side during a rendering step.

Figure 5C:
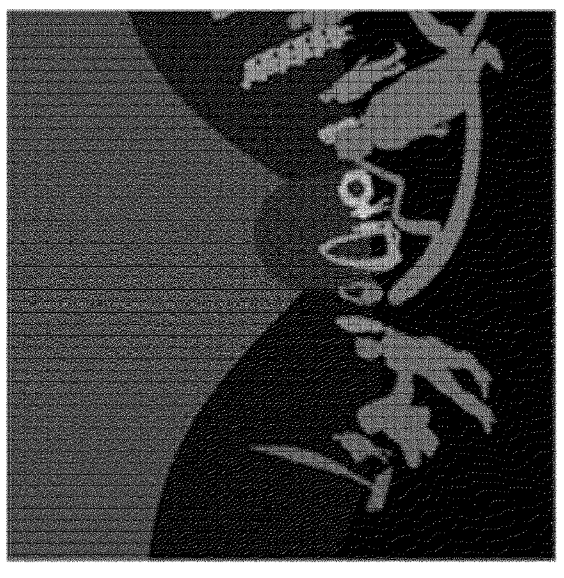
FIG. 5C illustrates an example of an entity map of the scene.
Figure 5B:
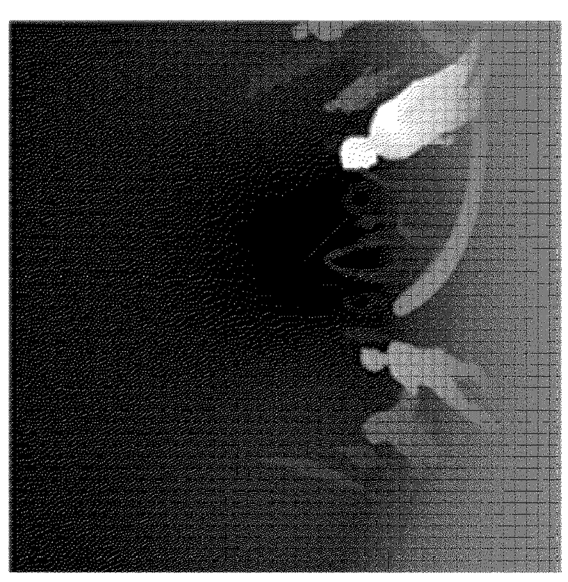
FIG. 5B illustrates an example of a depth map of the scene.
Figure 5A:
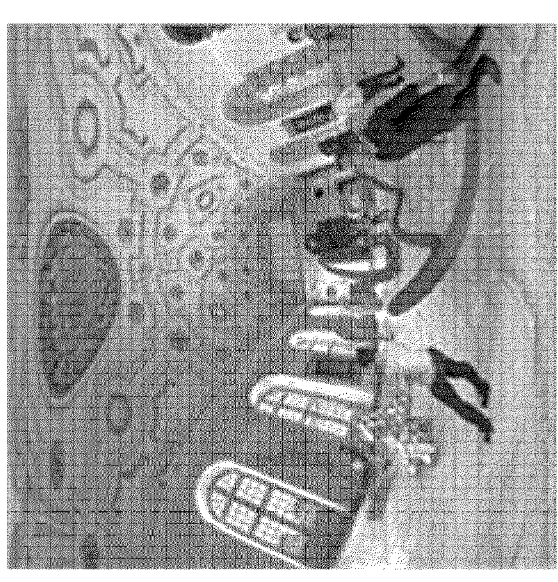
FIG. 5A illustrates an example of a texture map of a scene.

FIG. 5A illustrates an example of a texture map of a scene. FIG. 5B illustrates an example of a depth map of the scene. FIG. 5C illustrates an example of an entity map of the scene.

Figure 6B:
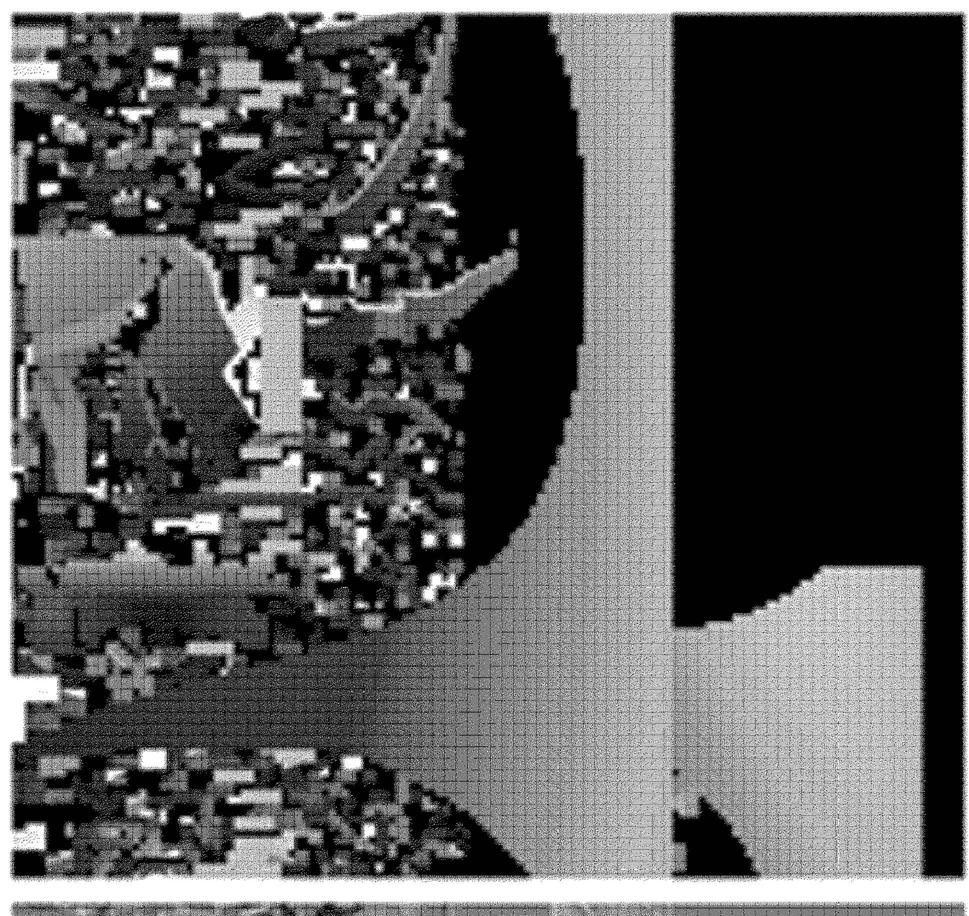
FIG. 6B illustrates the corresponding depth patch atlas.
Figure 6A:
FIG. 6A illustrates an example of a texture patch atlas after TMIV encoding of an MVD sequence.

An example bitstream generated by an immersive content encoder (such as the TMIV encoder) on an input MVD is composed of texture and depth patches packed into atlases, where patches have been extracted from the input views. One example is depicted in FIGS. 6A-6B for an input MVD, and in FIGS. 7A-7B for an input MVD with entities). Each patch is a part of one input view, and for every pixel of a patch there is a texture and a depth value.

FIG. 6A illustrates an example of a texture patch atlas after TMIV encoding of an MVD sequence. FIG. 6B illustrates the corresponding depth patch atlas.

Figures 7A, 7B:
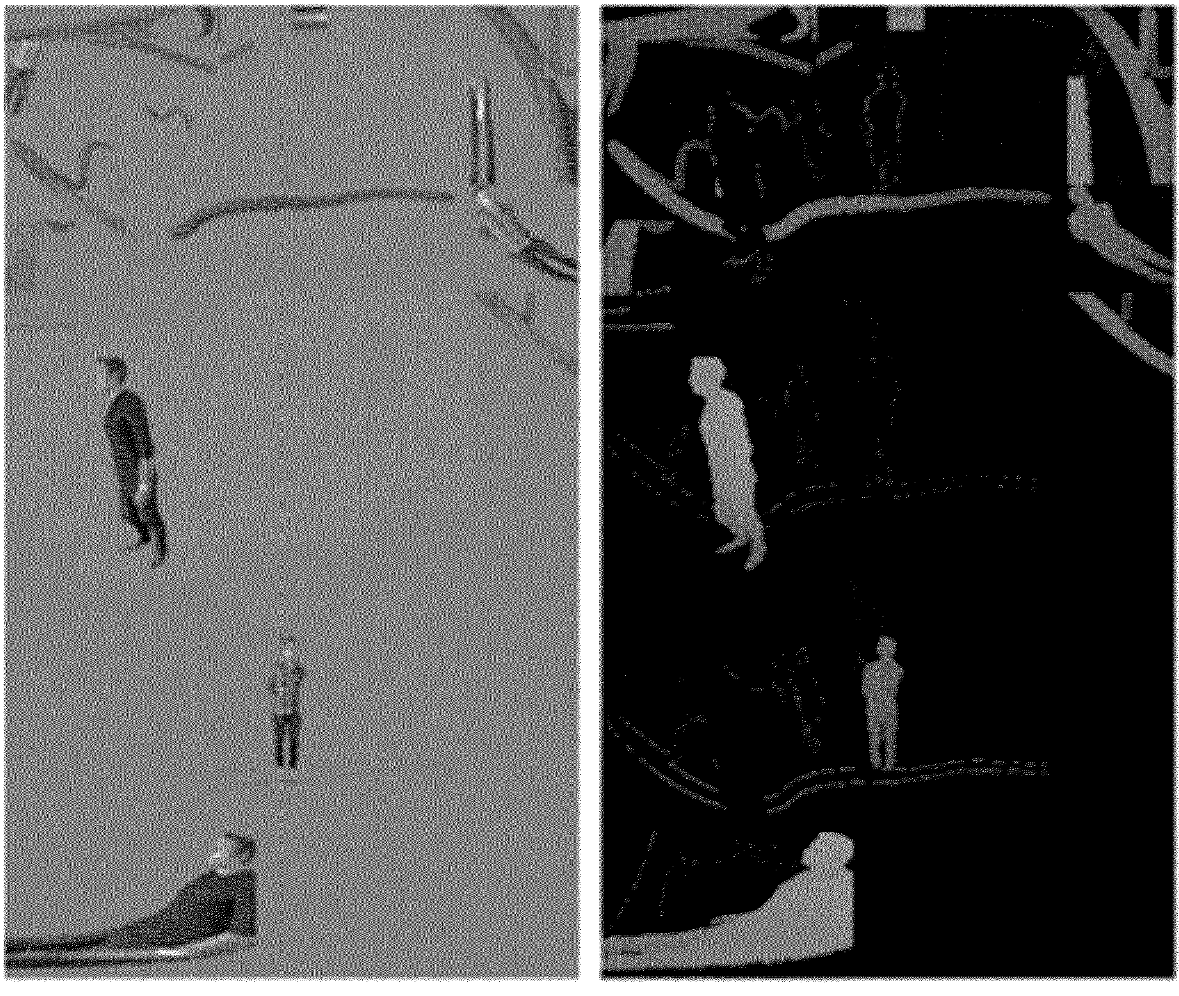
FIG. 7A illustrates an example of a texture patch atlas after TMIV encoding of selected entities of an MVD sequence.
FIG. 7B illustrates the corresponding depth patch atlas.

FIG. 7A illustrates an example of a texture patch atlas after TMIV encoding of selected entities of an MVD sequence. FIG. 7B illustrates the corresponding depth patch atlas.

Figure 9B:
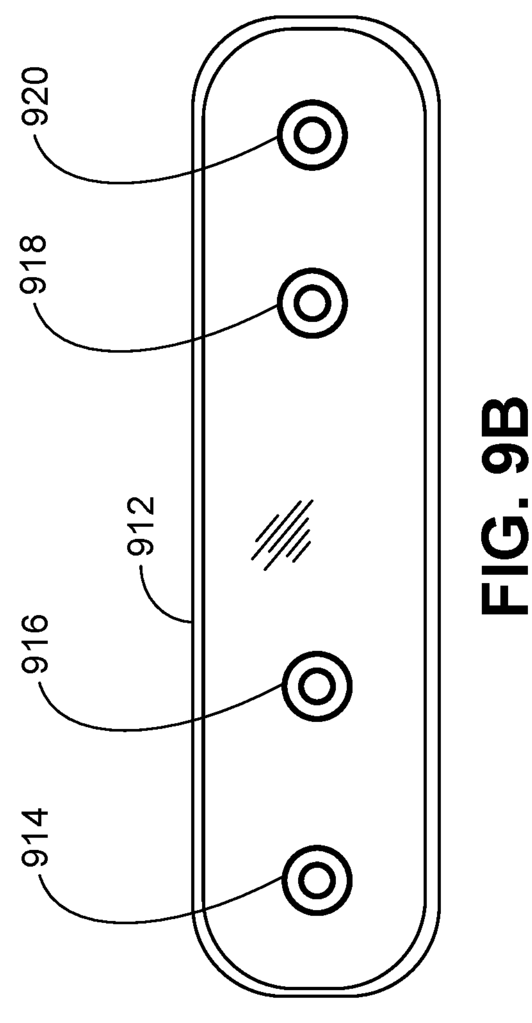
FIGS. 9A-9B illustrate examples of camera devices in which color and depth sensors have different positions.
Figure 9A:
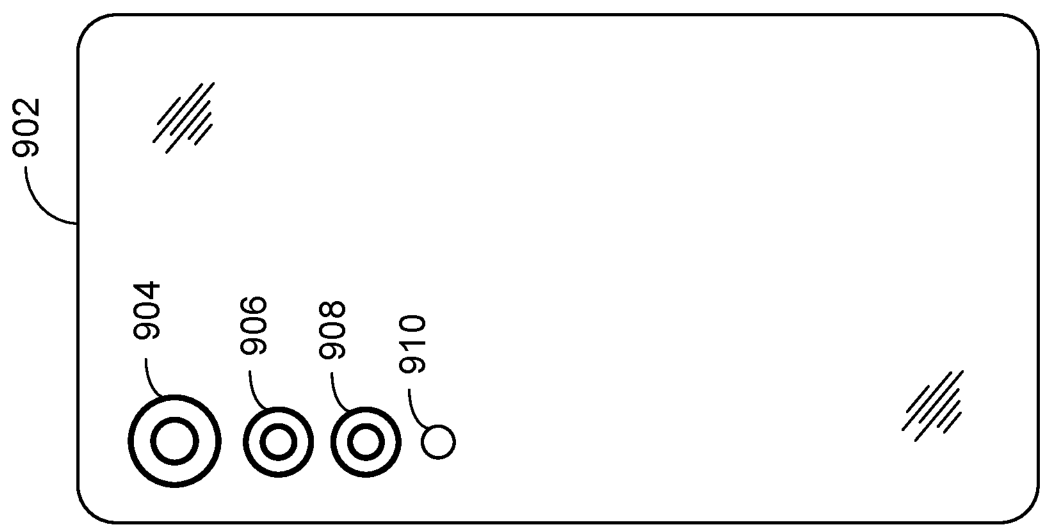

Given the different types and configurations of content acquisition devices, it is possible that cameras capturing the color and cameras capturing the geometry of the scene are not located at exactly the same position. This is the case for smartphones with depth sensors, or with RGB plus depth cameras (FIGS. 9A-9B). It is thus desirable for an immersive video coding system to be able to correctly process input content with texture information and depth information issued from different non-colocalized cameras.

Figure 8:
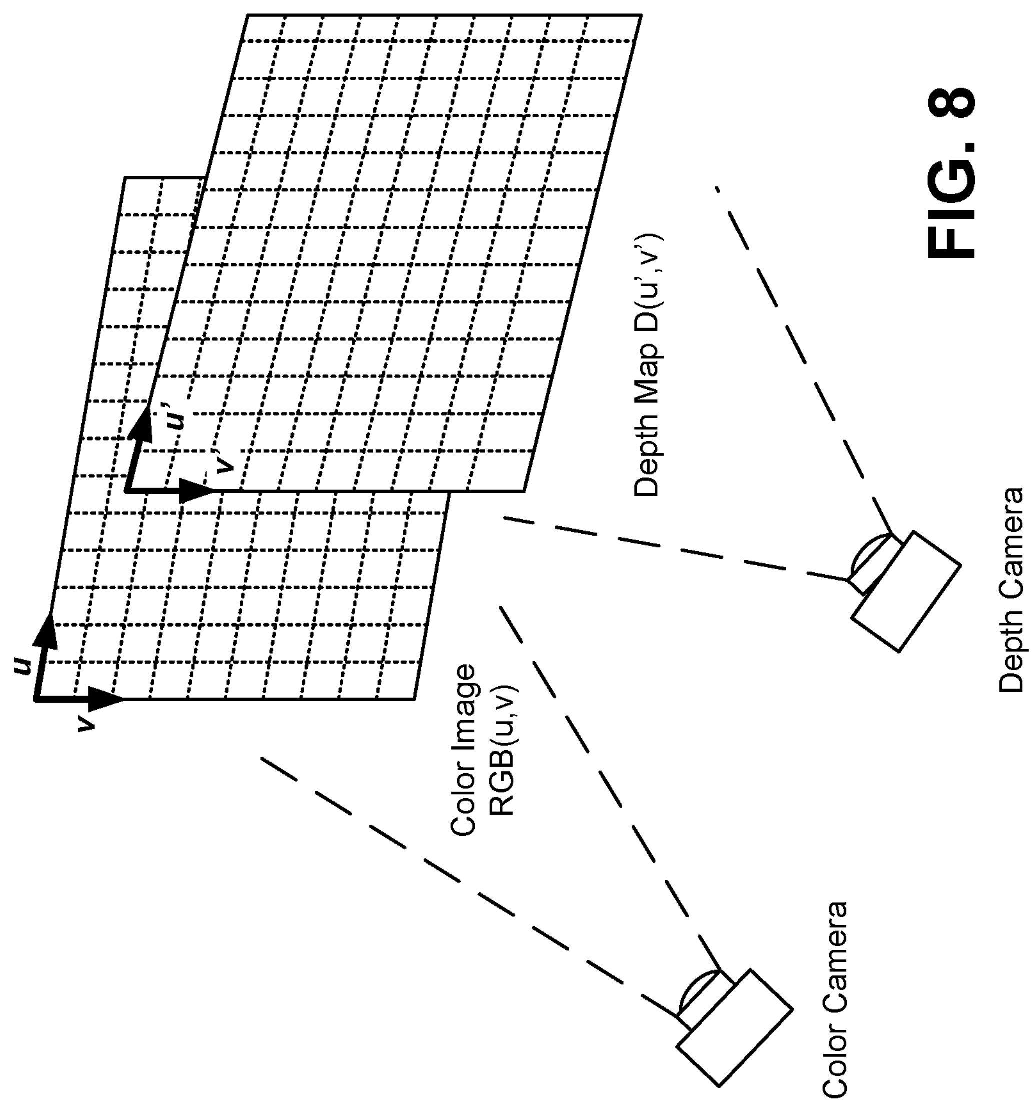
FIG. 8 schematically illustrates the different coordinates that result when a color camera and a depth camera have different positions.

FIG. 8 schematically illustrates the different coordinates that result when a color camera and a depth camera have different positions.

FIGS. 9A-9B illustrate examples of camera devices in which color and depth sensors have different positions. FIG. 9A illustrates a smartphone 902 with a macro vision RGB camera 904, a main RGB camera 906, a depth camera 908, and a laser autofocus system 910. FIG. 9B illustrates a depth camera system 912 with a right imager 914, an IR projector 916, a left imager 918, and an RGB module 920. An example of the a depth camera system that may be used in some embodiments in the Intel RealSense D435.

Example embodiments provide for an immersive video coding system that is able to process input material that uses non-colocalized cameras for texture versus depth and that also has segmentation information. Example embodiments provide information regarding which camera (texture or depth) is used to provide the segmentation. This may depend on the image processing that has been used to generate the segmentation, e.g. whether contour object detection is made by depth analysis or by color analysis.

In the case of non-colocalized RGB and depth cameras, there is not necessarily a 1-to-1 bijection between depth patches and texture patches.

An immersive video encoder such as a TMIV (Test Model for Immersive Video) encoder takes one or more MVDs together with segmentation information as input. The segmentation information may include a list of entities in an entity map. For example, all pixels belonging to a given object may be assigned the same integer value in the entity map, and pixels belonging to different objects are assigned different integer values. The encoding process generates patches for each entity to be transmitted. As the entity is related to either the depth map or the texture map, the generated patches are correctly generated either for the texture patches or the depth patches.

In the current MIV immersive video specification, patches that have been segmented are accompanied by respective patch data units (PDUs). Each patch data unit includes a patch data unit entry identifier pdu_entity_id in its PDU. An example syntax of a PDU is shown in Table 1, as described in the currently available 23090-12 specification. A problem with this system is that only one kind of patch (depth or texture) is correctly shaped with respect to the segmentation information.

TABLE 1

| | Descriptor |
|---|---|
| pdu_miv_extension( tileID, p ) { | |
| if( asme_max_entity_id > 0 ) | |
| pdu_entity_id[ tileID ][ p ] | u(v) |
| if( asme_depth_occ_threshold_flag ) | |
| pdu_depth_occ_threshold[ tileID ][ p ] | u(v) |
| if( asme_patch_texture_offset_enabled_flag ) | |
| for( c = 0; c < 3; c++ ) { | |
| pdu_texture_offset[ tileID ][ p ][ c ] | u(v) |
| if( asme_inpaint_enabled_flag ) | |
| pdu_inpaint_flag[ tileID ][ p ] | u(1) |
| } | |

An example of an immersive video rendering process may include some or all of the following stages:

Warping stage: depth deprojection/reprojection from each source view to a target view.

Visibility stage: for each pixel of the target view, depth selection from all projected depth values.

Filtering stage (optional): depth map filtering through local pixel neighborhood.

Blending stage: shading map computation, blending warped color values from all source views.

In a case where only some objects are rendered, the incoming data may be filtered, based on the entity number. Absent a 1-to-1 bijection between texture data and depth data, this process should be performed at an appropriate step of the rendering with respect to the segmentation information. Example embodiments provide for the encoding and decoding of information indicating which input data is used for segmentation. With regard to filtering, such information may be used as follows.

In an example embodiment, if segmentation information is linked to depth patches, then it is used directly in the warping stage by only warping depth pixels belonging to the selected entities.

In an example embodiment, if segmentation information is linked to texture patches, then this information may be used at the shading map computation (d), to blend only the color values of warped color pixels belonging to the selected entities.

Information regarding which input data is used for segmentation may further be used in a disambiguation process. As for any rendering, subjective performance is related to how the contours are rendered. Information on which map, either depth map or texture map, carries the segmentation may be used in some embodiments to disambiguate the contours at the rendering stage.

In a case where the segmentation information is generated using depth data: during the visibility stage, a decision is made regarding the depth that is selected for the rendered viewport. With noisy depth maps, an ambiguity can appear on some contour's pixels. In example embodiments, the segmentation information may be used to decide whether a pixel belongs to a foreground object or to the background, because it adds a second stage of selection, e.g. a majority voting procedure with regard to the entity identifier.

Segmentation information on texture: considering the same ambiguity on some pixels at the visibility stage, in some embodiments, there is not a final decision on the visibility map at the visibility stage; instead, a "soft" or provisional decision is made with potential depth values. Then, during the blending stage, a majority voting procedure based on entity identifiers may be applied to disambiguate and decide on the visibility map.

In some embodiments, immersive video data may be collected using a rig with two different types of depth sensors. The first one being cheap, with a relatively low spatial resolution (low number of pixels along width/height) and/or an inaccurate depth resolution (in z axis). The second one may have a finer depth sensor, with more pixels and/or a better precision in the z axis. As an example, this rig may be used to capture a scene with some characters. In some embodiments, segmentation may be performed only using data of the second type of depth sensor, for example to segment the faces of the characters, to transmit only these parts, hence reducing the overall transmitted bitrate. At the reconstruction side, depth from the lower precision sensor may be used to reconstruct the scene, while the depth coming from the high precision depth sensor serves to reconstruct the face of the characters. With respect to the selected entity, one face can be put in high resolution, then another one, and so on.

In some embodiments, information is provided in a metadata bitstream for each camera indicating whether segmentation information is provided for that camera. In some embodiments, this information may be carried by a Boolean value, but an integer value, a floating-point value, or other value may alternatively be used.

As any patch comes from a view, there is no need to derive this information at the patch level.

Figures 10, 11:
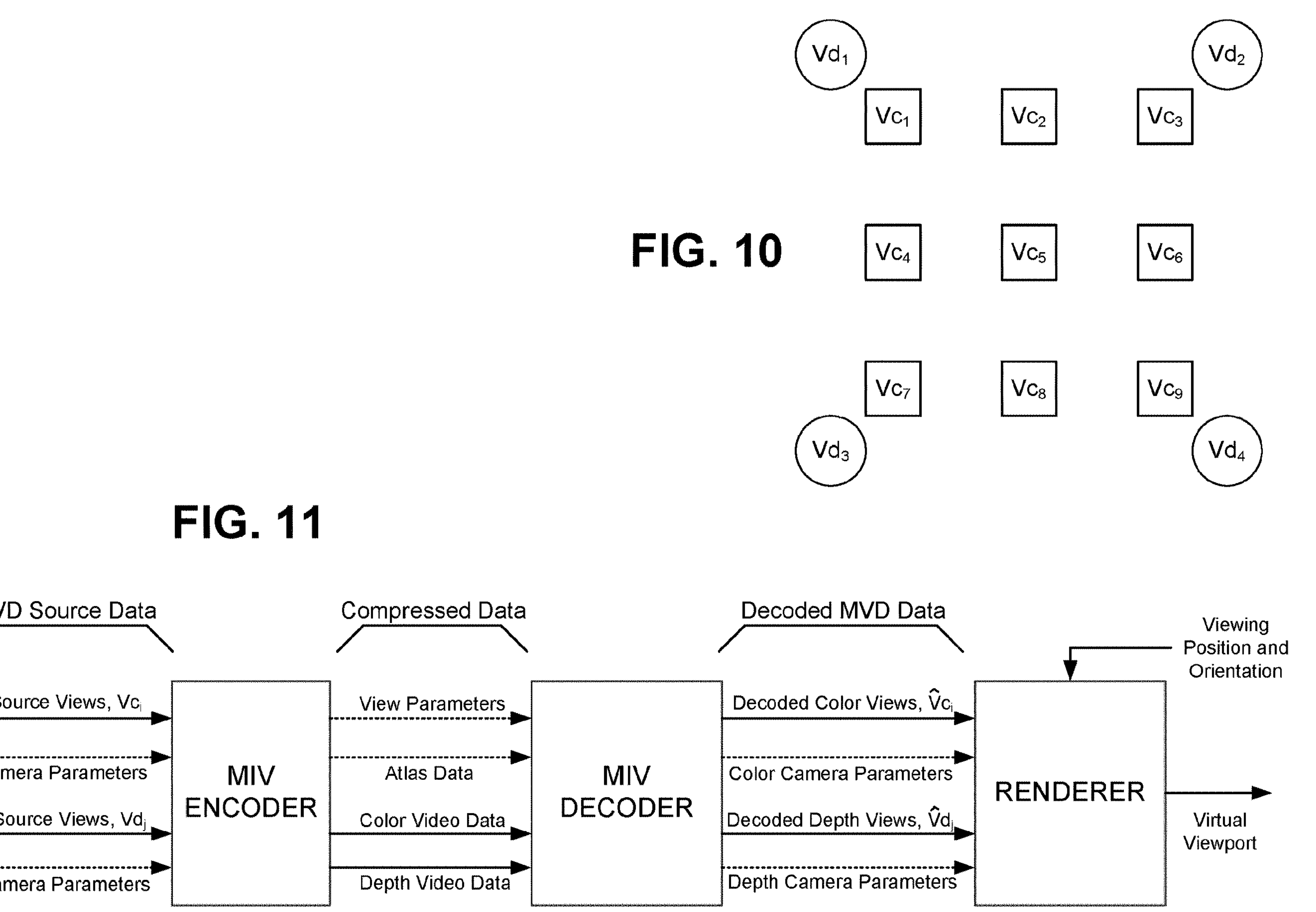
FIG. 10 schematically illustrates a camera array layout that may be used to capture views of a scene according to some embodiments.
FIG. 11 illustrates an example of a full MIV processing chain, from 3D scene acquisition to the synthesis of a virtual viewport.

Example embodiments may use a camera array layout as depicted schematically in FIG. 10. In this example layout, four depth sensors $Vd_j, j \in [1,4]$ are placed around a 3×3 color camera rig having nine color sensors $Vc_i, i \in [1,9]$. The invention is not restricted for this particular camera layout, however, and is valid for other numbers and relative positions of color and depth sensors.

An example of a full MIV processing chain, from 3D scene acquisition to the synthesis of a virtual viewport, is depicted in FIG. 11. Spatially unaligned color views and depth views are ingested as separate input views by the MIV encoder, each one with its own extrinsic and intrinsic camera parameters, and at the decoding side, the renderer is provided with the decoded color and depth views.

Figure 12:
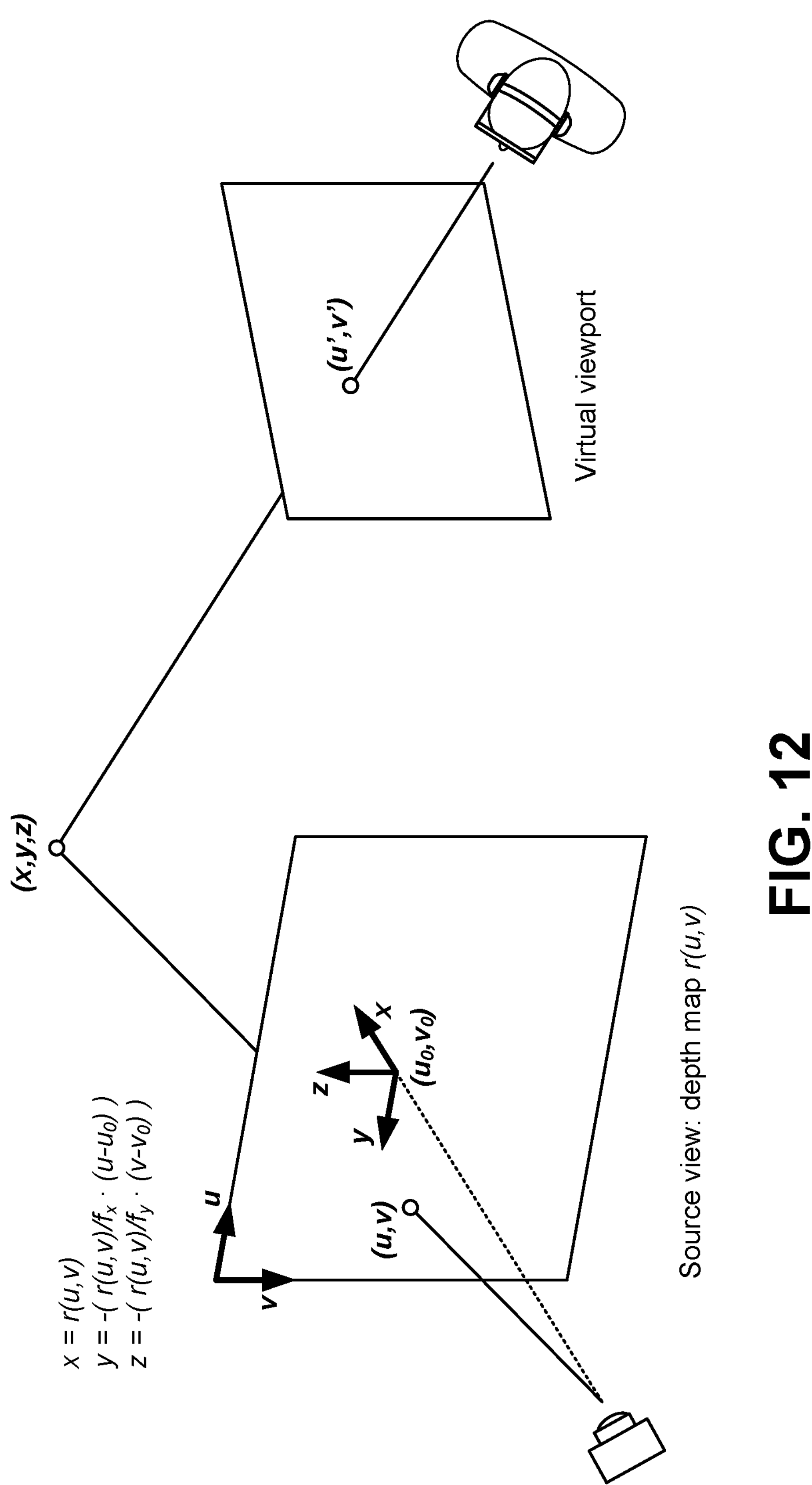
FIG. 12 is a schematic illustration of a reprojection process.

To synthesize new virtual viewpoints the renderer unprojects the (u,v) pixels of each decoded view to their (x,y,z) 3D position and then reproject their color attributes to the corresponding pixel coordinates (u',v') in the virtual viewport. A schematic illustration of the reprojection process is illustrated in FIG. 12 for a source view with perspective camera model. Such a direct unprojection-reprojection process is not straightforward in our context of source depth maps not aligned with source color maps, as the depth value r(u,v) of color pixel (u,v) is not directly available.

Example Encoded Data

In an example embodiment, information indicating whether segmentation data is provided for a view is signaled (e.g. in a bitstream) with a flag such as mvp_segmentation_flag[v]. Such a flag may be included in, for example, an MIV view parameters list. The following table illustrates an example syntax of an MIV view parameters list including a flag indicating, for each view, whether segmentation information is provided for the respective view.

TABLE 2

| | Descriptor |
|---|---|
| miv_view_params_list( ) { | |
| mvp_num_views_minus1 | u(16) |
| mvp_explicit_view_id_flag | u(1) |
| if( mvp_explicit_view_id_flag ) | |
| for( v = 0; v <= mvp_num_views_minus1; v++ ) | |
| mvp_view_id[ v ] | u(16) |
| for( v = 0; v <= mvp_num_views_minus1; v++ ) { | |
| camera_extrinsics( v ) | |
| mvp_inpaint_flag[ v ] | u(1) |
| mvp_segmentation_flag[ v ] | u(1) |
| } | |
| mvp_intrinsic_params_equal_flag | u(1) |
| for( v = 0; v <= mvp_intrinsic_params_equal_flag ? 0 : mvp_num_views_minus1; v++ ) | |
| camera_intrinsics( v ) | |
| if( casme_depth_quantization_params_present_flag ) { | |
| mvp_depth_quantization_params_equal_flag | u(1) |
| for( v = 0; v <= mvp_depth_quantization_equal_flag ? 0 : mvp_num_views_minus1; v++ ) | |
| depth_quantization( v ) | |
| } | |
| mvp_pruning_graph_params_present_flag | u(1) |
| if ( mvp_pruning_graph_params_present_flag ) | |
| for( v = 0; v <= mvp_num_views_minus1; v++ ) | |
| pruning_parents( v ) | |
| } | |

Information identifying the original camera (texture or depth) from which the segmentation has been computed may be used at the rendering stage, for example in making a decision on the contours of objects.

Example Methods and Systems

Figure 13:
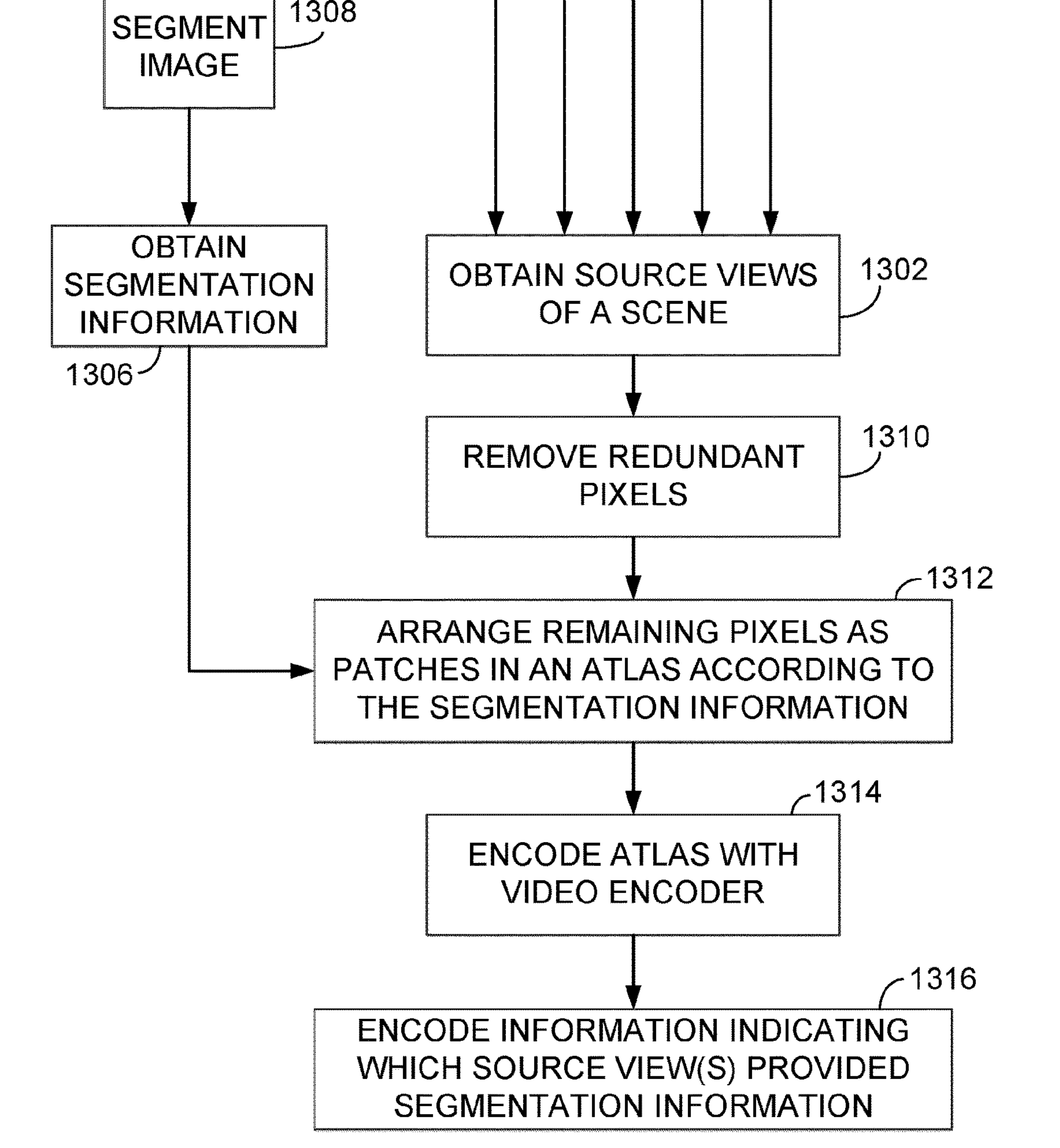
FIG. 13 is a flow diagram of an encoding method performed according to some embodiments.

As illustrated in FIG. 13, a method performed in some embodiments includes obtaining a plurality of source views of a scene (1302), e.g. from one or more color cameras and one or more depth cameras. For at least one of the source views, segmentation information is obtained (1306) that associates each of a plurality of regions of the source view with a respective entity. In this example, segmentation information is received for the view from depth camera 1304, although the segmentation information may be received for one or more of the other views. The segmentation information may be in the form of an entity map, although alternate forms may be used in other embodiments. The segmenting (1308) of the image into different entities may be performed using one or more of various different available techniques, such as contour object detection using color and/or depth as appropriate.

In some embodiments, depth-based segmentation is performed using techniques such as those described in "Depth-Based Segmentation", by E. François and B. Chupeau, IEEE Transactions on circuits and systems for video technology, vol. 7, No. 1, February 1997. In some embodiments, segmentation of the scene is based on the color or texture of the images of the scene, for example using techniques described in "Contour and Texture Analysis for Image Segmentation", by J. Malik, S. Belongie, T. Leung and J. Shi, in International Journal of Computer Vision 43(1), 7-27, 2001.

The plurality of source views are encoded as an immersive video comprising a plurality of patches, with the patches being segmented according to the segmentation information. In some embodiments, the encoding includes analyzing the plurality of views of the scene to remove redundant pixels (1310) representing portions of the scene that are viewed by more than one of the same type of camera. The remaining pixels are arranged (1312) as patches in a texture atlas and a depth atlas according to the segmentation information. In some embodiments, each patch includes image information from just one of the views (other views of the same portion of the scene having been removed as being redundant). To arrange the patches according to the segmentation information, the patches are segmented with the goal that each patch should include only pixels from one of the entities as determined by the segmentation. However, it should be understood that the segmentation will not have perfect accuracy. The segmentation may be most accurate for patches that come from a view for which segmentation information was provided, and less accurate for patches that come from a view for which segmentation information was not provided.

These atlases are encoded (1314) as a frame of video using a video encoder. Information is also encoded (1316) that indicates which source view(s) are associated with the segmentation information used to segment the patches. In some embodiments, the information indicating which of the source views are associated with the segmentation information used to segment the patches comprises, for each source view, a flag indicating whether that input view is associated with segmentation information used to segment the patches.

Figure 14:
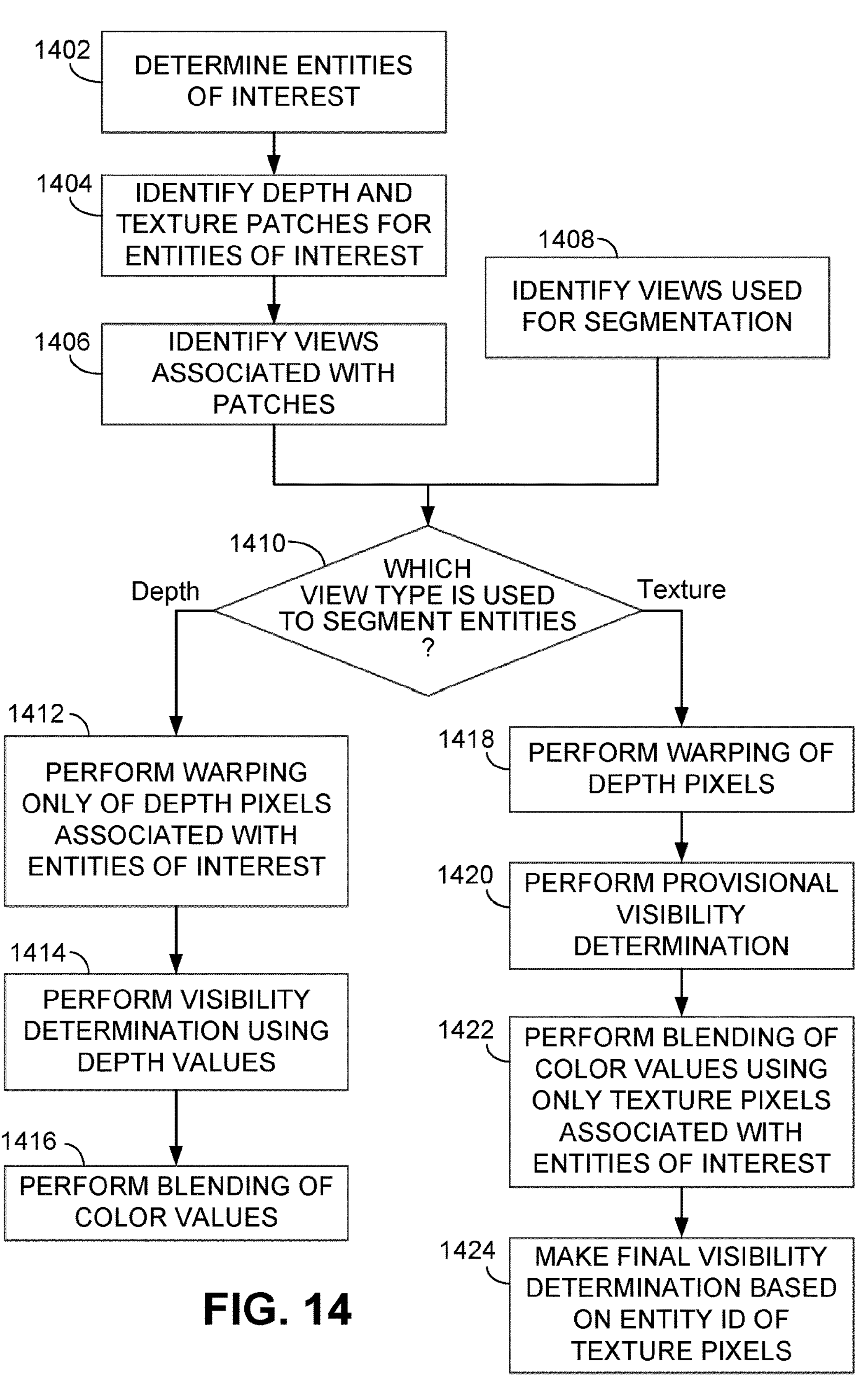
FIG. 14 is a flow diagram of a decoding method performed according to some embodiments.

An example embodiment of a rendering method is shown in FIG. 14. At 1402, one or more entities of interest may be selected for rendering. This may involve obtaining an identifier for each of the selected entities, such as the identifier pdu_entity_id. In some embodiments, this step is not performed, and all available entities are rendered (provided they are otherwise visible in the scene). At 1404, the depth and texture patches associated with each of the selected entities of interest are selected from among available patches in the depth and texture atlases. At 1406, for each relevant patch, information identifying the view that is the source of the patch is obtained. This information may be provided in a syntax element such as a patch data unit, for example in a parameter such as pdu_projection_id in the patch data unit syntax structure of Table 3. As seen in Table 3, the patch data unit syntax element is configurable to include the pdu_miv_extension of Table 1, which in turn includes the identifier pdu_entity_id, thus linking each patch with both an entity identifier of the patch and a corresponding view from which the patch was obtained.

TABLE 3

| patch_data_unit( tileID, patchIdx ) { | Descriptor |
|---|---|
| pdu_2d_pos_x[ tileID ][ patchIdx ] | ue(v) |
| pdu_2d_pos_y[ tileID ][ patchIdx ] | ue(v) |
| pdu_2d_size_x_minus1[ tileID ][ patchIdx ] | ue(v) |
| pdu_2d_size_y_minus1[ tileID ][ patchIdx ] | ue(v) |
| pdu_3d_offset_u[ tileID ][ patchIdx ] | u(v) |
| pdu_3d_offset_v[ tileID ][ patchIdx ] | u(v) |
| pdu_3d_offset_d[ tileID ][ patchIdx ] | u(v) |
| if( asps_normal_axis_max_delta_value_enabled_flag ) | |
| pdu_3d_range_d[ tile ID ][ patchIdx ] | u(v) |
| pdu_projection_id[ tileID ][ patchIdx ] | u(v) |
| pdu_orientation_index[ tileID ][ patchIdx ] | u(v) |
| if( afps_lod_mode_enabled_flag ) { | |
| pdu_lod_enabled_flag[ tile ID ][ patchIdx ] | u(1) |
| if( pdu_lod_enabled_flag[ tileID ][ patchIdx ] ) { | |
| pdu_lod_scale_x_minus1[ tileID ][ patchIdx ] | ue(v) |
| pdu_lod_scale_y_idc[ tileID ][ patchIdx ] | ue(v) |
| } | |
| } | |
| if( asps_plr_enabled_flag ) | |
| plr_data( tileID, patchIdx ) | |
| if( asps_miv_extension_present_flag ) | |
| pdu_miv_extension( tileID, patchIdx ) /* Specified in ISO/IEC 23090-12 */ | |
| } | |

At 1408, information is obtained indicating which views were used to provide segmentation information. Such information may be obtained through a flag such as an mvp_segmentation_flag associated with each view, indicating whether the associated view was used by the encoder to provide segmentation information. Alternatively, such information may be obtained through other means (e.g. through a list of views used to provide segmentation information). Based on the information associating views with patches (from 1406) and the information indicating which views were used for segmentation (from 1408), a rendering system determines at 1410 which type of view—texture or depth—was used to provide segmentation information for each patch.

In some embodiments, in a case where the view that provides segmentation information for the patch is a depth camera view, a rendering process proceeds as follows. At 1412, depth deprojection/reprojection is performed from each source view to a target view, with the warping being applied only to depth pixels belonging to the selected entities. At 1414, for each pixel of the target view, visibility is determined based on depth selection from all projected depth values. In some embodiments, an optional depth map filtering (not illustrated) is performed based on the local neighborhood of each pixel. At 1416, shading map computation is performed, blending warped color values from all source views.

In some embodiments, in a case where the view that provides segmentation information for the patch is a depth camera view, a rendering process proceeds as follows. At 1418, warping is performed on the depth pixels of the patch. At 1420, at least a provisional visibility determination is made based on depth values, with a final decision on the visibility map being determined during a subsequent blending stage. As one example, considering N input views, after warping there are N visibility maps, with some of the visibility maps completely empty for the current patch under processing. In some embodiments, a provisional visibility determination may keep all of these visibility maps, allowing for a final determination of visibility to be made at a later stage. In some embodiments, instead of keeping all N visibility maps, the rendering system keeps track only of a minimum and a maximum depth, which results in two visibility maps rather than N visibility maps. The maintenance of more than one visibility map allows for flexibility for the following steps to perform the decision. In some embodiments, an optional depth map filtering (not illustrated) is performed based on the local neighborhood of each pixel. At 1422, shading map computation is performed, blending warped color values from all source views. At 1424 (which may be concurrent with 1422), a final visibility determination is made. The final determination may be made in some embodiments using a majority voting procedure based on entity identifiers to disambiguate and decide on the visibility map.

Based on the rendering processes of FIG. 14, a rendering system may store a scene (e.g. a frame of a video scene) in a frame buffer or otherwise cause the scene to be displayed to a user.

The example of FIG. 14 shows a process in which the warping, the visibility determination, and the blending processes all differ depending on whether a texture view or a depth view was used for segmentation information. In some embodiments, however, one or more of those processes may be the same, regardless of whether texture or depth was used for segmentation.

Figure 15:
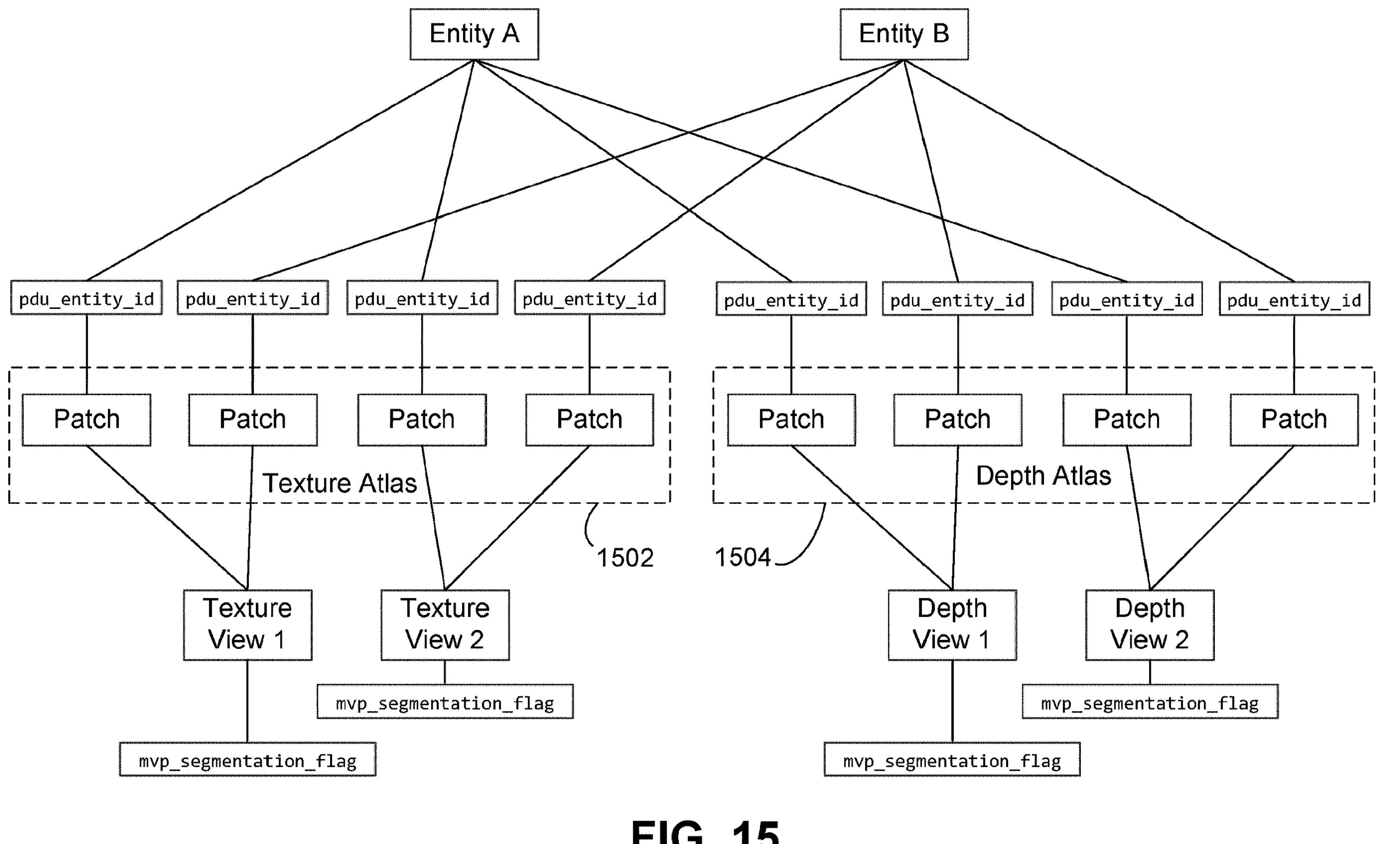
FIG. 15 is a schematic illustration of a relationships among different data in some embodiments.

FIG. 15 illustrates an example of a data schema represented in encoded scene data according to some embodiments. In this example a scene includes two entities (Entity A and Entity B), each of which is identified by an entity identifier (e.g. pdu_entity_id). The entities in this example are captured using four views (Texture View 1, Texture View 2, Depth View 1, Depth View 2). Each of these views is associated with a flag (e.g. mvp_segmentation_flag) indicating whether that view is used to provide segmentation information. Each patch in a texture atlas 1502 is associated with one of the texture views and with an identifier of the entity represented by the patch. This association may be conveyed through a patch data unit syntax element, as described above. Similarly, each patch in a depth atlas 1504 is associated with one of the texture views and with an identifier of the entity represented by the patch. This information may also be conveyed in a patch data unity syntax element. While the example of FIG. 15 shows a small number of entities, patches, and views for the sake of illustration, it should be understood that some embodiments make use of much larger numbers of entities, patches, and views. With a data schema as shown in FIG. 15, a rendering system can determine whether the segmentation of an entity was performed using a texture view or a depth view, and it can render the entity accordingly.

In some embodiments, the bitstream is constrained such that either the views that are signaled as being used for partition information are all depth views or the views that are signaled as being used for partition information are all texture views. However, in other embodiments, the bitstream is processed to allow for handling of a case in which some views used for partition are depth views and some views used for partition are texture views. An example method of performing such processing is provided in FIG. 16.

At 1602, one or more entities of interest may be selected for rendering. This may involve obtaining an identifier for each of the selected entities, such as the identifier pdu_entity_id. In some embodiments, this step is not performed, and all available entities are rendered (provided they are otherwise visible in the scene). At 1604, the depth and texture patches associated with each of the selected entities of interest are selected from among available patches in the depth and texture atlases. At 1606, for each relevant patch, information identifying the view that is the source of the patch is obtained. This information may be provide in a syntax element such as a patch data unit, for example in a parameter such as pdu_projection_id in the patch data unit syntax structure of Table 3, above.

Figure 16:
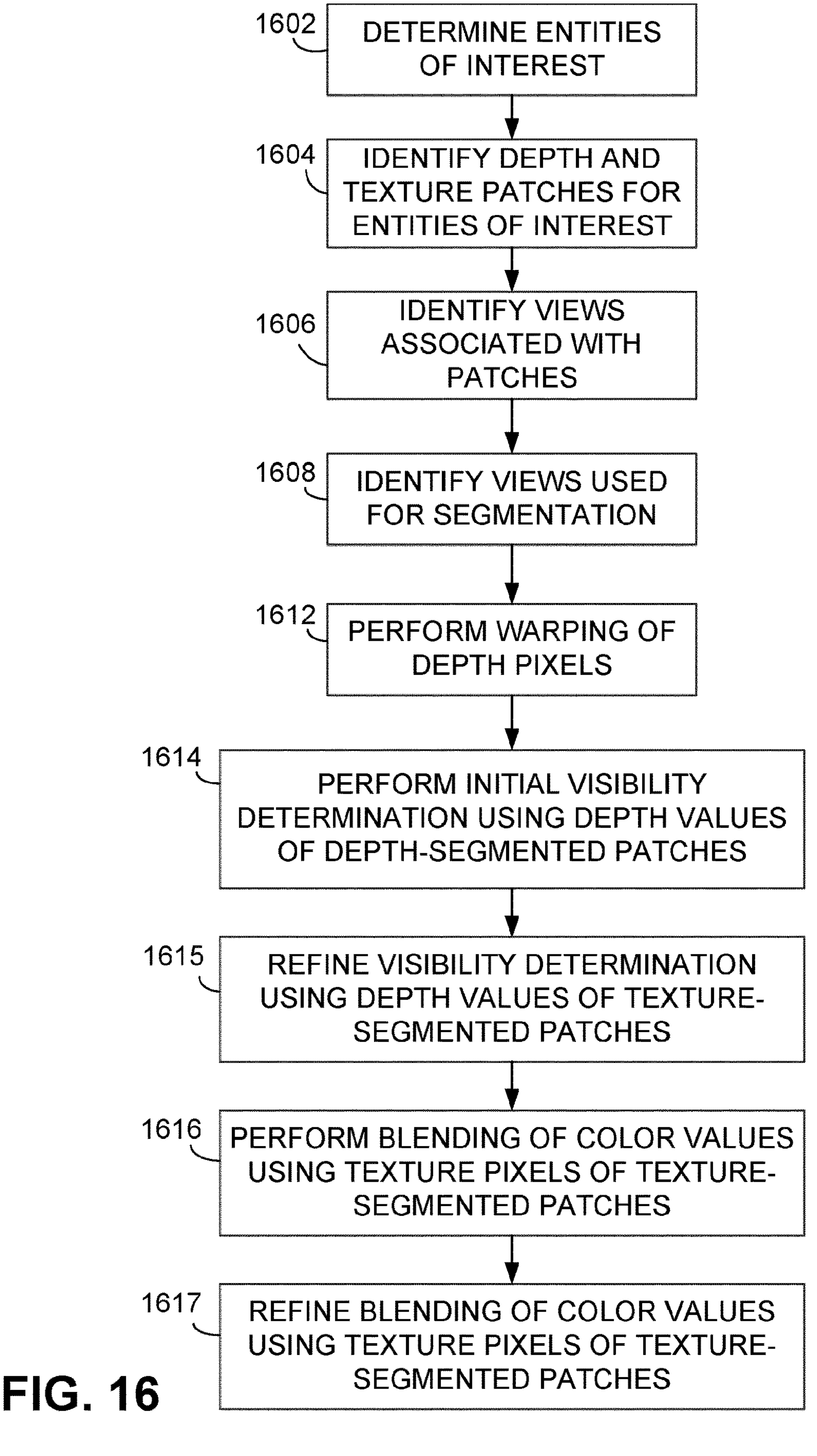
FIG. 16 is a flow diagram of a decoding method performed according to some embodiments.

At 1608, information is obtained indicating which views were used to provide segmentation information. Such information may be obtained through a flag such as an mvp_segmentation_flag associated with each view, indicating whether the associated view was used by the encoder to provide segmentation information. Alternatively, such information may be obtained through other means (e.g. through a list of views used to provide segmentation information). At 1612, depth deprojection/reprojection is performed from each source view to a target view, with the warping being applied only to depth pixels belonging to the selected entities. At 1614, for each pixel of the target view, an initial visibility determination is made based on depth selection from projected depth values based on patches that were segmented using depth views. At 1615, the initial visibility determination is refined based on depth selection from projected depth values based on patches that were segmented using texture views. In some embodiments, an optional depth map filtering (not illustrated) is performed based on the local neighborhood of each pixel. At 1616, an initial blending is performed based on pixels of texture patches that were segmented using texture views. At 1617, the initial blending is refined based on pixels of texture patches that were segmented using depth views. Based on the rendering processes of FIG. 16, a rendering system may store a scene (e.g. a frame of a video scene) in a frame buffer or otherwise cause the scene to be displayed to a user. The method of FIG. 16 is given only as an example. The steps of FIG. 16 may be performed in various orders in different embodiments, and other methods may alternatively be used to perform rendering in cases where both depth and texture views are used for segmentation.

Further Embodiments

This disclosure describes a variety of aspects, including tools, features, embodiments, models, approaches, etc. Many of these aspects are described with specificity and, at least to show the individual characteristics, are often described in a manner that may sound limiting. However, this is for purposes of clarity in description, and does not limit the disclosure or scope of those aspects. Indeed, all of the different aspects can be combined and interchanged to provide further aspects. Moreover, the aspects can be combined and interchanged with aspects described in earlier filings as well.

The aspects described and contemplated in this disclosure can be implemented in many different forms. While some embodiments are illustrated specifically, other embodiments are contemplated, and the discussion of particular embodiments does not limit the breadth of the implementations. At least one of the aspects generally relates to video encoding and decoding, and at least one other aspect generally relates to transmitting a bitstream generated or encoded. These and other aspects can be implemented as a method, an apparatus, a computer readable storage medium having stored thereon instructions for encoding or decoding video data according to any of the methods described, and/or a computer readable storage medium having stored thereon a bitstream generated according to any of the methods described.

In the present disclosure, the terms "reconstructed" and "decoded" may be used interchangeably, the terms "pixel" and "sample" may be used interchangeably, the terms "image," "picture" and "frame" may be used interchangeably. Usually, but not necessarily, the term "reconstructed" is used at the encoder side while "decoded" is used at the decoder side.

The terms HDR (high dynamic range) and SDR (standard dynamic range) often convey specific values of dynamic range to those of ordinary skill in the art. However, additional embodiments are also intended in which a reference to HDR is understood to mean "higher dynamic range" and a reference to SDR is understood to mean "lower dynamic range." Such additional embodiments are not constrained by any specific values of dynamic range that might often be associated with the terms "high dynamic range" and "standard dynamic range."

Various methods are described herein, and each of the methods comprises one or more steps or actions for achieving the described method. Unless a specific order of steps or actions is required for proper operation of the method, the order and/or use of specific steps and/or actions may be modified or combined. Additionally, terms such as "first", "second", etc. may be used in various embodiments to modify an element, component, step, operation, etc., such as, for example, a "first decoding" and a "second decoding". Use of such terms does not imply an ordering to the modified operations unless specifically required. So, in this example, the first decoding need not be performed before the second decoding, and may occur, for example, before, during, or in an overlapping time period with the second decoding.

Various numeric values may be used in the present disclosure, for example. The specific values are for example purposes and the aspects described are not limited to these specific values.

Embodiments described herein may be carried out by computer software implemented by a processor or other hardware, or by a combination of hardware and software. As a non-limiting example, the embodiments can be implemented by one or more integrated circuits. The processor can be of any type appropriate to the technical environment and can encompass one or more of microprocessors, general purpose computers, special purpose computers, and processors based on a multi-core architecture, as non-limiting examples.

Various implementations involve decoding. "Decoding", as used in this disclosure, can encompass all or part of the processes performed, for example, on a received encoded sequence in order to produce a final output suitable for display. In various embodiments, such processes include one or more of the processes typically performed by a decoder, for example, entropy decoding, inverse quantization, inverse transformation, and differential decoding. In various embodiments, such processes also, or alternatively, include processes performed by a decoder of various implementations described in this disclosure, for example, extracting a picture from a tiled (packed) picture, determining an upsampling filter to use and then upsampling a picture, and flipping a picture back to its intended orientation.

As further examples, in one embodiment "decoding" refers only to entropy decoding, in another embodiment "decoding" refers only to differential decoding, and in another embodiment "decoding" refers to a combination of entropy decoding and differential decoding. Whether the phrase "decoding process" is intended to refer specifically to a subset of operations or generally to the broader decoding process will be clear based on the context of the specific descriptions.

Various implementations involve encoding. In an analogous way to the above discussion about "decoding", "encoding" as used in this disclosure can encompass all or part of the processes performed, for example, on an input video sequence in order to produce an encoded bitstream. In various embodiments, such processes include one or more of the processes typically performed by an encoder, for example, partitioning, differential encoding, transformation, quantization, and entropy encoding. In various embodiments, such processes also, or alternatively, include processes performed by an encoder of various implementations described in this disclosure.

As further examples, in one embodiment "encoding" refers only to entropy encoding, in another embodiment "encoding" refers only to differential encoding, and in another embodiment "encoding" refers to a combination of differential encoding and entropy encoding. Whether the phrase "encoding process" is intended to refer specifically to a subset of operations or generally to the broader encoding process will be clear based on the context of the specific descriptions.

When a figure is presented as a flow diagram, it should be understood that it also provides a block diagram of a corresponding apparatus. Similarly, when a figure is presented as a block diagram, it should be understood that it also provides a flow diagram of a corresponding method/process.

Various embodiments refer to rate distortion optimization. In particular, during the encoding process, the balance or trade-off between the rate and distortion is usually considered, often given the constraints of computational complexity. The rate distortion optimization is usually formulated as minimizing a rate distortion function, which is a weighted sum of the rate and of the distortion. There are different approaches to solve the rate distortion optimization problem. For example, the approaches may be based on an extensive testing of all encoding options, including all considered modes or coding parameters values, with a complete evaluation of their coding cost and related distortion of the reconstructed signal after coding and decoding. Faster approaches may also be used, to save encoding complexity, in particular with computation of an approximated distortion based on the prediction or the prediction residual signal, not the reconstructed one. A mix of these two approaches can also be used, such as by using an approximated distortion for only some of the possible encoding options, and a complete distortion for other encoding options. Other approaches only evaluate a subset of the possible encoding options. More generally, many approaches employ any of a variety of techniques to perform the optimization, but the optimization is not necessarily a complete evaluation of both the coding cost and related distortion.

The implementations and aspects described herein can be implemented in, for example, a method or a process, an apparatus, a software program, a data stream, or a signal. Even if only discussed in the context of a single form of implementation (for example, discussed only as a method), the implementation of features discussed can also be implemented in other forms (for example, an apparatus or program). An apparatus can be implemented in, for example, appropriate hardware, software, and firmware. The methods can be implemented in, for example, a processor, which refers to processing devices in general, including, for example, a computer, a microprocessor, an integrated circuit, or a programmable logic device. Processors also include communication devices, such as, for example, computers, cell phones, portable/personal digital assistants ("PDAs"), and other devices that facilitate communication of information between end-users.

Reference to "one embodiment" or "an embodiment" or "one implementation" or "an implementation", as well as other variations thereof, means that a particular feature, structure, characteristic, and so forth described in connection with the embodiment is included in at least one embodiment. Thus, the appearances of the phrase "in one embodiment" or "in an embodiment" or "in one implementation" or "in an implementation", as well any other variations, appearing in various places throughout this disclosure are not necessarily all referring to the same embodiment.

Additionally, this disclosure may refer to "determining" various pieces of information. Determining the information can include one or more of, for example, estimating the information, calculating the information, predicting the information, or retrieving the information from memory.

Further, this disclosure may refer to "accessing" various pieces of information. Accessing the information can include one or more of, for example, receiving the information, retrieving the information (for example, from memory), storing the information, moving the information, copying the information, calculating the information, determining the information, predicting the information, or estimating the information.

Additionally, this disclosure may refer to "receiving" various pieces of information. Receiving is, as with "accessing", intended to be a broad term. Receiving the information can include one or more of, for example, accessing the information, or retrieving the information (for example, from memory). Further, "receiving" is typically involved, in one way or another, during operations such as, for example, storing the information, processing the information, transmitting the information, moving the information, copying the information, erasing the information, calculating the information, determining the information, predicting the information, or estimating the information.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended for as many items as are listed.

Also, as used herein, the word "signal" refers to, among other things, indicating something to a corresponding decoder. For example, in certain embodiments the encoder signals a particular one of a plurality of parameters for region-based filter parameter selection for de-artifact filtering. In this way, in an embodiment the same parameter is used at both the encoder side and the decoder side. Thus, for example, an encoder can transmit (explicit signaling) a particular parameter to the decoder so that the decoder can use the same particular parameter. Conversely, if the decoder already has the particular parameter as well as others, then signaling can be used without transmitting (implicit signaling) to simply allow the decoder to know and select the particular parameter. By avoiding transmission of any actual functions, a bit savings is realized in various embodiments. It is to be appreciated that signaling can be accomplished in a variety of ways. For example, one or more syntax elements, flags, and so forth are used to signal information to a corresponding decoder in various embodiments. While the preceding relates to the verb form of the word "signal", the word "signal" can also be used herein as a noun.

Implementations can produce a variety of signals formatted to carry information that can be, for example, stored or transmitted. The information can include, for example, instructions for performing a method, or data produced by one of the described implementations. For example, a signal can be formatted to carry the bitstream of a described embodiment. Such a signal can be formatted, for example, as an electromagnetic wave (for example, using a radio frequency portion of spectrum) or as a baseband signal. The formatting can include, for example, encoding a data stream and modulating a carrier with the encoded data stream. The information that the signal carries can be, for example, analog or digital information. The signal can be transmitted over a variety of different wired or wireless links, as is known. The signal can be stored on a processor-readable medium.

We describe a number of embodiments. Features of these embodiments can be provided alone or in any combination, across various claim categories and types. Further, embodiments can include one or more of the following features, devices, or aspects, alone or in any combination, across various claim categories and types:

A bitstream or signal that includes one or more of the described syntax elements, or variations thereof.

A bitstream or signal that includes syntax conveying information generated according to any of the embodiments described.

Creating and/or transmitting and/or receiving and/or decoding a bitstream or signal that includes one or more of the described syntax elements, or variations thereof.

Creating and/or transmitting and/or receiving and/or decoding according to any of the embodiments described.

A method, process, apparatus, medium storing instructions, medium storing data, or signal according to any of the embodiments described.

A TV, set-top box, cell phone, tablet, head-mounted display, or other electronic device that receives a signal (e.g. over the air or over a wired connection) that includes an encoded image, and performs adaptation of filter parameters according to any of the embodiments described.

Note that various hardware elements of one or more of the described embodiments are referred to as "modules" that carry out (i.e., perform, execute, and the like) various functions that are described herein in connection with the respective modules. As used herein, a module includes hardware (e.g., one or more processors, one or more microprocessors, one or more microcontrollers, one or more microchips, one or more application-specific integrated circuits (ASICs), one or more field programmable gate arrays (FPGAs), one or more memory devices) deemed suitable for a given implementation. Each described module may also include instructions executable for carrying out the one or more functions described as being carried out by the respective module, and it is noted that those instructions could take the form of or include hardware (i.e., hardwired) instructions, firmware instructions, software instructions, and/or the like, and may be stored in any suitable non-transitory computer-readable medium or media, such as commonly referred to as RAM, ROM, etc.

Although features and elements are described above in particular combinations, each feature or element can be used alone or in any combination with the other features and elements. In addition, the methods described herein may be implemented in a computer program, software, or firmware incorporated in a computer-readable medium for execution by a computer or processor. Examples of computer-readable storage media include, but are not limited to, a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WTRU, UE, terminal, base station, RNC, or any host computer.

What is claimed:

1. A method comprising:

obtaining a plurality of source views of a scene;

for at least one of the source views, obtaining segmentation information associating each of a plurality of regions of the source view with a respective entity;

encoding the plurality of source views as an immersive video comprising a plurality of patches, the patches being segmented according to the segmentation information; and encoding information indicating which of the source views are associated with the segmentation information used to segment the patches.

2. The method of claim 1, wherein the information indicating which of the source views are associated with the segmentation information used to segment the patches comprises, for each source view, a flag indicating whether that input source view is associated with segmentation information used to segment the patches.

3. The method of claim 1, wherein the segmentation information associated with a source view comprises an entity map associated with the source view.

4. The method of claim 1, wherein the information indicating which of the source views are associated with the segmentation information used to segment the patches comprises information indicating whether the segmentation information is based on a depth image or on a texture image.

5. A method comprising:

obtaining an encoded immersive video comprising a plurality of patches, the video representing a plurality of input views of a scene;

obtaining information indicating which of the input views are associated with segmentation information used to segment the patches; and rendering the immersive video according to the information indicating which of the input views are associated with segmentation information used to segment the patches.

6. The method of claim 5, wherein the information indicating which of the input views are associated with the segmentation information used to segment the patches comprises, for each input view, a flag indicating whether that input view is associated with segmentation information used to segment the patches.

7. The method of claim 5, wherein the information indicating which of the input views are associated with the segmentation information used to segment the patches comprises information indicating whether the segmentation information is based on a depth image or on a texture image.

8. The method of claim 5, wherein rendering the immersive video according to the information indicating which of the input views are associated with segmentation information used to segment the patches comprises:

identifying at least one selected entity to be rendered; and in response to a determination that the segmentation information is based on a depth image, performing warping of depth pixels of the immersive video only for depth patches that are associated with the at least one selected entity.

9. The method of claim 5, wherein rendering the immersive video according to the information indicating which of the input views are associated with segmentation information used to segment the patches comprises:

identifying at least one selected entity to be rendered; and in response to a determination that the segmentation information is based on a texture image:

performing warping of depth pixels of the immersive video for depth patches including at least depth patches that are associated with the at least one selected entity; and performing blending of color values based only on color pixels that are associated with the at least one selected entity.

10. The method of claim 5, wherein rendering the immersive video according to the information indicating which of the input views are associated with segmentation information used to segment the patches comprises:

in response to a determination that the segmentation information is based on a depth image, making a visibility determination based at least in part on the segmentation information.

11. An apparatus comprising one or more processors configured to perform:

obtaining a plurality of source views of a scene;

for at least one of the source views, obtaining segmentation information associating each of a plurality of regions of the source view with a respective entity;

encoding the plurality of source views as an immersive video comprising a plurality of patches, the patches being segmented according to the segmentation information; and encoding information indicating which of the source views are associated with the segmentation information used to segment the patches.

12. The apparatus of claim 11, wherein the information indicating which of the source views are associated with the segmentation information used to segment the patches comprises, for each source view, a flag indicating whether that source view is associated with segmentation information used to segment the patches.

13. The apparatus of claim 11, wherein the segmentation information associated with a source view comprises an entity map associated with the source view.

14. The apparatus of claim 11, wherein the information indicating which of the source views are associated with the segmentation information used to segment the patches comprises information indicating whether the segmentation information is based on a depth image or on a texture image.

15. An apparatus comprising one or more processors configured to perform:

obtaining an encoded immersive video comprising a plurality of patches, the video representing a plurality of input views of a scene;

obtaining information indicating which of the input views are associated with segmentation information used to segment the patches; and rendering the immersive video according to the information indicating which of the input views are associated with segmentation information used to segment the patches.

16. The apparatus of claim 15, wherein the information indicating which of the input views are associated with the segmentation information used to segment the patches comprises, for each input view, a flag indicating whether that input view is associated with segmentation information used to segment the patches.

17. The apparatus of claim 15, wherein the information indicating which of the input views are associated with the segmentation information used to segment the patches comprises information indicating whether the segmentation information is based on a depth image or on a texture image.

18. The apparatus of claim 15, wherein rendering the immersive video according to the information indicating which of the input views are associated with segmentation information used to segment the patches comprises:

identifying at least one selected entity to be rendered; and in response to a determination that the segmentation information is based on a depth image, performing warping of depth pixels of the immersive video only for depth patches that are associated with the at least one selected entity.

19. The apparatus of claim 15, wherein rendering the immersive video according to the information indicating which of the input views are associated with segmentation information used to segment the patches comprises:

identifying at least one selected entity to be rendered; and in response to a determination that the segmentation information is based on a texture image:

performing warping of depth pixels of the immersive video for depth patches including at least depth patches that are associated with the at least one selected entity; and performing blending of color values based only on color pixels that are associated with the at least one selected entity.

20. The apparatus of claim 15, wherein rendering the immersive video according to the information indicating which of the input views are associated with segmentation information used to segment the patches comprises:

in response to a determination that the segmentation information is based on a depth image, making a visibility determination based at least in part on the segmentation information.

* * * * *